(12) United States Patent
Yoshida et al.

(10) Patent No.: US 6,604,399 B1
(45) Date of Patent: Aug. 12, 2003

(54) STAMPING DIE FOR CUTTING AND FORMING SHEET MATERIAL

(75) Inventors: Sadaaki Yoshida, Kawasaki (JP); Masayuki Sasaki, Kawasaki (JP); Keisuke Fujikura, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/694,261

(22) Filed: Oct. 24, 2000

(30) Foreign Application Priority Data

Mar. 31, 2000 (JP) ........................................ 2000-096851

(51) Int. Cl.$^7$ .............................................. B21D 28/14
(52) U.S. Cl. .......................................... 72/326; 72/325
(58) Field of Search ......................... 72/325, 326, 328; 83/686, 690, 694

(56) References Cited

U.S. PATENT DOCUMENTS

| | | | | |
|---|---|---|---|---|
| 1,732,880 A | * | 10/1929 | Eisenhauer | 72/326 |
| 2,350,756 A | * | 6/1944 | Heinhold | 72/326 |
| 3,357,078 A | * | 12/1967 | Moltchan | 72/325 |
| 3,913,420 A | * | 10/1975 | Coon | 72/325 |
| 4,509,355 A | * | 4/1985 | Oishi | 72/325 |
| 5,377,519 A | * | 1/1995 | Hayashi | 72/326 |
| 5,867,758 A | | 2/1999 | Yoshida et al. | |

FOREIGN PATENT DOCUMENTS

| | | | | |
|---|---|---|---|---|
| CH | 14455 | * | 3/1897 | 72/325 |
| JP | 16632 | * | 1/1984 | 72/325 |
| JP | 09-62096 | | 3/1997 | |
| SU | 1310-076 | * | 5/1987 | 72/326 |

\* cited by examiner

*Primary Examiner*—Daniel C. Crane
(74) *Attorney, Agent, or Firm*—Armstrong, Westerman & Hattori, LLP

(57) ABSTRACT

The present invention aims at providing a blade for use with a development device, method of manufacturing the same, die for manufacturing the same, and development device and image-forming device having the same that can more stably form a high quality image. The inventive blade is manufactured using a stamping die comprising an upper mold portion including a knockout, a lower mold portion including a punch and movable relative to the upper mold portion. In the stamping die, the knockout includes in cross section a first flat portion and a triangular projection portion that projects from the first flat portion, while the punch includes in cross section a second flat portion and a triangular groove portion formed on the second flat portion, and a first angle at which the triangular projection portion projects from the first flat portion is larger than a second angle at which the triangular groove portion is recessed from the second flat portion.

3 Claims, 18 Drawing Sheets

STAMPING DIE FOR CUTTING AND FORMING SHEET MATERIAL

BACKGROUND OF THE INVENTION

The present invention relates generally to blades that regulate a developer layer thickness on a development roller in a development device, methods of manufacturing the same, and dies for manufacturing the same. The present invention also relates to development devices and image-forming devices using the blade. The present invention is suitable, for example, for a blade that regulates a layer thickness of a nonmagnetic monocomponent developer on the development roller, a method of forming the layer of the nonmagnetic monocomponent developer using the blade, a development device having the blade, and an electrophotographic image-forming device having one or more of these elements. Notwithstanding, the present invention is not limited to embodiments using the nonmagnetic monocomponent developer.

Hereupon, the "nonmagnetic monocomponent developer" is a single component developer that is nonmagnetized and includes no carrier. The "electrophotographic image-forming device" by which we mean is an image-forming device employing the Carlson process described in U.S. Pat. No. 2,297,691, as typified by a laser printer, and denotes a nonimpact printer that provides recording by depositing a developer as a recording material on a recordable medium (e.g., printing paper, and OHP film).

With the recent development of office automation, the use of electrophotographic image-forming devices such as a laser printer for computer's output devices, facsimile units, photocopiers, etc. have spread steadily. The electrophotographic process generally uses a photoconductive insulator (e.g., photosensitive drum, and photosensitive belt), and follows the procedural steps of charging, exposure to light, development, transfer, fixing, and other post-processes.

The charging step uniformly electrifies the photosensitive drum (e.g., at −600V). The exposure step irradiates a laser beam or the like on the photosensitive drum, and changes the electrical potential at the irradiated area down, for example, to −50 V or so, forming an electrostatic latent image. The development step electrically deposits a developer onto the photosensitive drum using, for example, the reversal process, and visualizes the electrostatic latent image. The reversal process is a development method that forms an electric field by a development bias in areas where electric charge is eliminated by exposure to light, and deposits the developer having the same polarity as uniformly charged areas on the photosensitive drum by the electric field. The transfer step forms a toner image corresponding to the electrostatic latent image on a recordable medium. The fixing step fuses and fixes the toner image on the medium using heat, pressure or the like, thereby obtaining a printed matter. The post-processes may include charge neutralization and cleaning on the photosensitive drum from which toner has been transferred out, a collection and recycle and/or disposal of residual toner, etc.

The developer for use with the aforementioned development step can be broadly divided into a monocomponent developer using toner and a dual-component developer using toner and a carrier. The toner may be a particle prepared, for example, in such a manner that an additive and a colorant such as a dye and a carbon black, or the like are dispersed in a binder resin made of synthetic macromolecular compound, and then is ground into a fine powder of approximately 3 through 15 $\mu$m. The additive, which is a fine particle used as a toner surface reforming agent, has been used originally for improving fluidity of toner, but sometimes for improving image quality. The additive may be selected among colloidal silica, titanium oxide, alumina, zinc stearate, and others. A usable carrier may include, for example, an iron powder or ferrite bead of approximately 100 $\mu$m in diameter. The monocomponent developer advantageously results in (1) simple and miniature equipment due to omitting mechanisms for controlling a carrier deterioration and toner density, and mixing and agitation mechanisms, and (2) no carrier or other waste in used toner.

The monocomponent developer may be further classified into a magnetic monocomponent developer in which toner contains a magnetic powder, and nonmagnetic monocomponent developer in which toner does not contain the same. However, the magnetic monocomponent developer is disadvantageous in (1) the low transfer performance due to the high content of low electrical resistant magnetic powder which hinders the increase of the electric charge amount, (2) the difficulty in colorization due to its black-color magnetic powder of low transparency; (3) the low fixing performance, which thereby requires high temperature and/or high pressure, due to the magnetic powder, increasing a running cost. Accordingly, the nonmagnetic monocomponent developer without these disadvantages is expected to be in increasing demand in future.

For the nonmagnetic monocomponent developer, the toner having a relatively high volume resistivity (e.g., at 300 G$\Omega$·cm, etc.) is commonly used. In addition, the toner, as basically carries no electric charge, needs to be charged by the triboelectricity or charge injection in the development device.

The development process employing the nonmagnetic monocomponent developer is divided into contact- and noncontact-type development processes: The contact-type development process deposits a developer on the photosensitive drum by bringing the development roller carrying the developer into contact with the photosensitive drum; and the noncontact-type development process providing a certain gap (e.g., of about 350 $\mu$m) between the development roller and the photosensitive drum to space them from each other, and flies the developer from the development roller and deposits the same onto the photosensitive drum.

It is significant for the development process employing the nonmagnetic monocomponent developer to ensure a sufficient image density by controlling the amount of toner fed from the development roller to the photosensitive drum. Thus, it is very important to form a specified toner layer through controlling its thickness on the development roller. As a typical method for regulating a toner layer thickness, it has conventionally been proposed to provide an elastic blade (restriction blade) in contact with the development roller to maintain the layer thickness uniform.

The contact-type development device employing the typical nonmagnetic monocomponent developer generally comprises a reset roller, a development roller, and a blade. The development roller is connected with a bias power supply from which the development bias is applied. The reset roller, which is also called supply roller or application roller, comes in contact with the development roller and serves not only to supply toner to the development roller, but also to scrape off and remove the toner unused for the development and remaining on the development roller. The development roller, which is, for example, a roller made of resin, adsorbs the charged toner onto its surface in the form of a thin layer, and conveys it to a development area in contact with the photosensitive drum.

The blade is brought into contact with the development roller and serves to regulate the toner layer to a uniform thickness. The blade may be made up of a metal member, or of an elastic member such as urethane, and regulates the toner layer by bringing an end portion or non-end portion (namely midsection) thereof into contact with the development roller. Disadvantageously, too thin toner layer would lead to reduced and varied image densities, and too thick toner layer would increase the ratio of the toner having reverse charge or low charge, and produce fogging (a phenomenon of undesirably coloring with the toner areas that have no image and thus are expected to be of white clarity). Accordingly, the blade is required to form a toner layer having an adequate thickness.

A description will be given of a regulation of the toner layer thickness by the blade, when the blade brings its end portion into contact with the development roller, with reference to FIG. 28. Hereupon, FIG. 28 is a schematic sectional view for showing a relationship between curvature of the blade and the regulated toner layer, where the blade 500 includes an end portion 510 (any one of end portions 512–516) which may have three different values of curvature. If the blade 500 includes the end portion 512 having the smallest curvature, the blade 500 is too deeply engaged in the development roller 20, and the thickness of the toner layer T (i.e., height from the surface of the development roller) becomes thin, as represented by the dash-single-dot line in the drawing. On the other hand, if the blade 500 includes the end portion 516 having the largest curvature, the blade 500 is too shallowly engaged in the development roller 20, and the thickness of the toner layer T becomes thick, as represented by the broken line in the drawing. An adequate thickness of the toner layer may be obtained where the blade 500 includes the end portion 514 having curvature indicated by the solid line. As described above, the blade 500 needs to include the end portion 510 having adequate curvature.

As a method of forming such an end portion having adequate curvature on the blade, the present inventors have disclosed, in Japanese Laid-Open Patent Application, Publication No. 9-62096 (U.S. Pat. No. 5,867,758), a technique to form the end portion 514 utilizing a shear drop that inevitably formed in a blanking process. The blanking is carried out using a blanking die that includes a die and a punch, and upon blanking, a shear drop is formed at the end portion 510, and a burr (or flash) is formed at an end portion 520 opposite to the end portion 510. The shear drop means a curved portion formed upon shearing, and the burr means an acutely angled end portion formed upon blanking. The dimensions of the shear drop has conventionally been configured to be smaller than those of the end portion 512, but the present inventors has disclosed in the above publication that the dimensions of the shear drop may be made larger by making a clearance between the die and punch wider than a conventional distance.

In operation of development, the toner is charged (e.g., negatively) using sliding friction among the reset roller, the blade, and the development roller. The negatively charged toner thereafter is fed onto a surface of the development roller by the reset roller, and deposited thereon by electrostatic adsorption. Subsequently, the toner layer on the development roller is leveled with the blade to form a thin layer having a uniform thickness of about 10 $\mu$m through 40 $\mu$m. The toner is conveyed from the photosensitive drum to the development roller, and adhered to an electrostatic latent image on the photosensitive drum with the electrical force of attraction by a predetermined voltage applied to a development area. Consequently, the latent image is visualized and developed. Next, the reset roller removes the residual toner on the development roller that is left in a no-image area where no latent image is formed. The development process repeats a series of these operations.

However, the idea seized upon the present inventors that the manufacturing method and the resultant blade disclosed in Japanese Laid-Open Patent Application, Publication No. 9-62096 still had several disadvantages, and thus an improvement of the manufacturing method should be necessary.

First, the manufacturing method in the publication would shorten the life of the blanking die. It is because the wide clearance is allowed in the blanking die beyond the range conventionally considered to be suitable for blanking, overloading the blanking die.

Second, the manufacturing method in the publication would have difficulties in controlling the dimensions of the shear drop, and if the dimensions of the shear drop were those depicted as the end portion 516, image quality would become deteriorated. This is because the dimensions of the shear drop depend upon not only the sharpness of the edge of the die but also the hardness of the blade material, which is difficult to be adequately adjusted.

For instance, the edge of the die, immediately after ground, would be too sharp and thus form too small shear drop, so that the wasted blanking of around five thousands sheets of the material would be required for providing a specified sharpness with the die. This would result in reduced yields and increased costs.

Similarly, varied hardness of the blade material would lead to poor reproducibility, and reduced yields and increased costs as well. To be more specific, the end portion 510 may be represented by a height X and length Y ($Y_1$ and $Y_2$) of a curve thereof, and the manufacturing method in the publication uses the height X as the reference when the end portion 510 is formed. Hereupon, FIG. 29 is a schematic partially enlarged section of a conventional blade 500. In order to obtain a desired height X, for instance, a relationship between the clearance and the height X is established, and the clearance is adjusted to a necessary distance. However, the present inventors later discovered that the wearing out in the end portion 510 proceeds so as to reduce the length Y instead of the height X. For instance, the length $Y_1$ becomes the length $Y_2$ due to the wearing out, in FIG. 29. However, the length Y of the blade obtained by the manufacturing method in the publication also cannot accurately be determined due to a wide range of variations according to the hardness of the material. As a matter of course, the manufacturing method in the publication cannot provide any information on the resultant blade such as a relationship between the height X and the length Y, and a relationship between the clearance and the length Y. Therefore, it is the information on the clearance required for attaining a certain height X, but not the information on the length Y that can be provided in the manufacturing method in the publication. Since the height is not worn out, and the end portion 510 depends upon the length Y; in other words, the manufacturing method in the publication provides low reproducibility of the blade including the desired end portion 514.

On the other hand, even such a blade as initially includes the end portion 514 having an appropriate curvature would wear out due to a continuous use to become shaped like the end portion 516, and make the toner layer thick. The present inventors, having studied the cause thereof, finally discovered that they did not then consider a relationship between hardness of a blade material and that of an inorganic substance (e.g., external additive) that is added to toner. Particularly, in recent image-forming devices that require high-speed printing operation, the development roller rotates at high speed, and thus an increased load is likely to be imposed on the blade.

BRIEF SUMMARY OF THE INVENTION

Accordingly, it is an exemplified general object of the present invention to provide a novel and useful blade for use with a development device, method of manufacturing the same, die for manufacturing the same, development device and image-forming device having the same in which one or more of the above disadvantages in the prior arts are eliminated.

Another exemplified and more specific object of the present invention is to provide a blade for use with a development device, method of manufacturing the same, die for manufacturing the same, development device and image-forming device having the same that may stably form high-quality images.

In order to achieve the above objects, the inventive stamping die comprises an upper mold portion and lower mold portion that includes a punch and is movable relative to the upper mold portion, and the knockout includes in cross section a first flat portion and a triangular projection portion that projects from the first flat portion. The punch includes in cross section a second flat portion and a triangular groove portion formed on the second flat portion, and a first angle at which the triangular projection portion projects from the first flat portion is larger than a second angle at which the triangular groove portion is recessed from the second flat portion. Alternatively, or optionally, the above knockout includes in cross section a first flat portion and a triangular projection portion that projects from the first flat portion, while the above punch includes in cross section a second flat portion and a triangular groove portion formed on the second flat portion, and a first width of a joint between the triangular projection portion and the first flat portion is smaller than a second width of the triangular groove portion viewed from the second flat portion. Further, alternatively or optionally, the above knockout includes in cross section a first flat portion, the punch includes in cross section a second flat portion, any one of the knockout and the punch includes a projection portion that projects from any one of the first flat portion and the second flat portion, the other of the knockout and the punch includes a groove portion formed on the other of the first and second flat portions, and the projection portion and the groove portion have different dimensions. Furthermore, the blade as one exemplified embodiment of the present invention is manufactured using any one of these stamping die.

These stamping die experimentally includes a base portion and a specified curved end portion, and can manufacture a blade usable for regulating a layer thickness of developer. The end portion of the blade includes in cross section a height and a length, and one or more of the stamping dies, for example, can manufacture the blade in which an approximately specific relationship is established for each thickness between the height and the length in the end portion. In addition, one or more of the stamping dies can manufacture the blade in which an approximately specific relationship is established between the length in the end portion and the second angle irrespective of the hardness of the blade material. Moreover, one or more of the stamping dies can manufacture the blade in which an approximately specific relationship is established for each thickness of the base portion of the blade between the length of the end portion and the second angle.

The inventive development device including a development roller and the aforementioned blade also has the same effects as the above blade. Similarly, the inventive image-forming device including a photosensitive body, a charger that charges the photosensitive body, an exposure part that exposes the photosensitive body charged by the charger, and forms an electrostatic latent image, the above development device that develops the exposed photosensitive body and visualize the electrostatic latent image into a toner image, and a transfer part that transfers the toner image onto a recordable medium also has the same effect as the above blade.

A development device as another exemplified embodiment of the present invention comprises a development roller, and a blade that is brought into contact with the development roller, and forms a layer of developer on the development roller with a predetermined layer thickness, the developer includes toner and an inorganic fine particle, and the blade includes a portion that has higher hardness than the inorganic fine particle and comes in contact with the developer. This development device can maintain the predetermined layer thickness on the development roller, as the blade is not worn out by the inorganic fine particle. The inventive image-forming device including a photosensitive body, a charger that charges the photosensitive body, an exposure part that exposes the photosensitive body charged by the charger, and forms an electrostatic latent image, the above development device that develops the exposed photosensitive body and visualize the electrostatic latent image into a toner image, and a transfer part that transfers the toner image onto a recordable medium also has the same effect as the above development device.

A method of manufacturing a blade as one exemplified embodiment of the present invention comprises the steps of placing a sheet material in a lower mold portion of a stamping die, in which said stamping die comprises an upper mold portion including a knockout, and the above lower mold portion including a punch, and movable relative to the upper mold portion, the knockout including in cross section a first flat portion, the punch including in cross section a second flat portion, any one of the knockout and the punch including a projection portion that projects from any one of the first flat portion and the second flat portion, the other of the knockout and the punch including a groove portion formed on the other of the first and second flat portions; bringing the upper mold portion and the lower mold portion near to each other; bringing the knockout and the punch relatively near to each other; bringing the knockout and the punch relatively apart from each other; and bringing the upper mold portion and the lower mold portion apart from each other. It has been experimentally shown that this method of manufacturing a blade can manufacture a blade including a specified end portion by using the above-described stamping die.

Other objects and further features of the present invention will become readily apparent from the following description of the embodiments with reference to accompanying drawings.

DETAILED DESCRIPTION OF THE INVENTION

Figure 1:
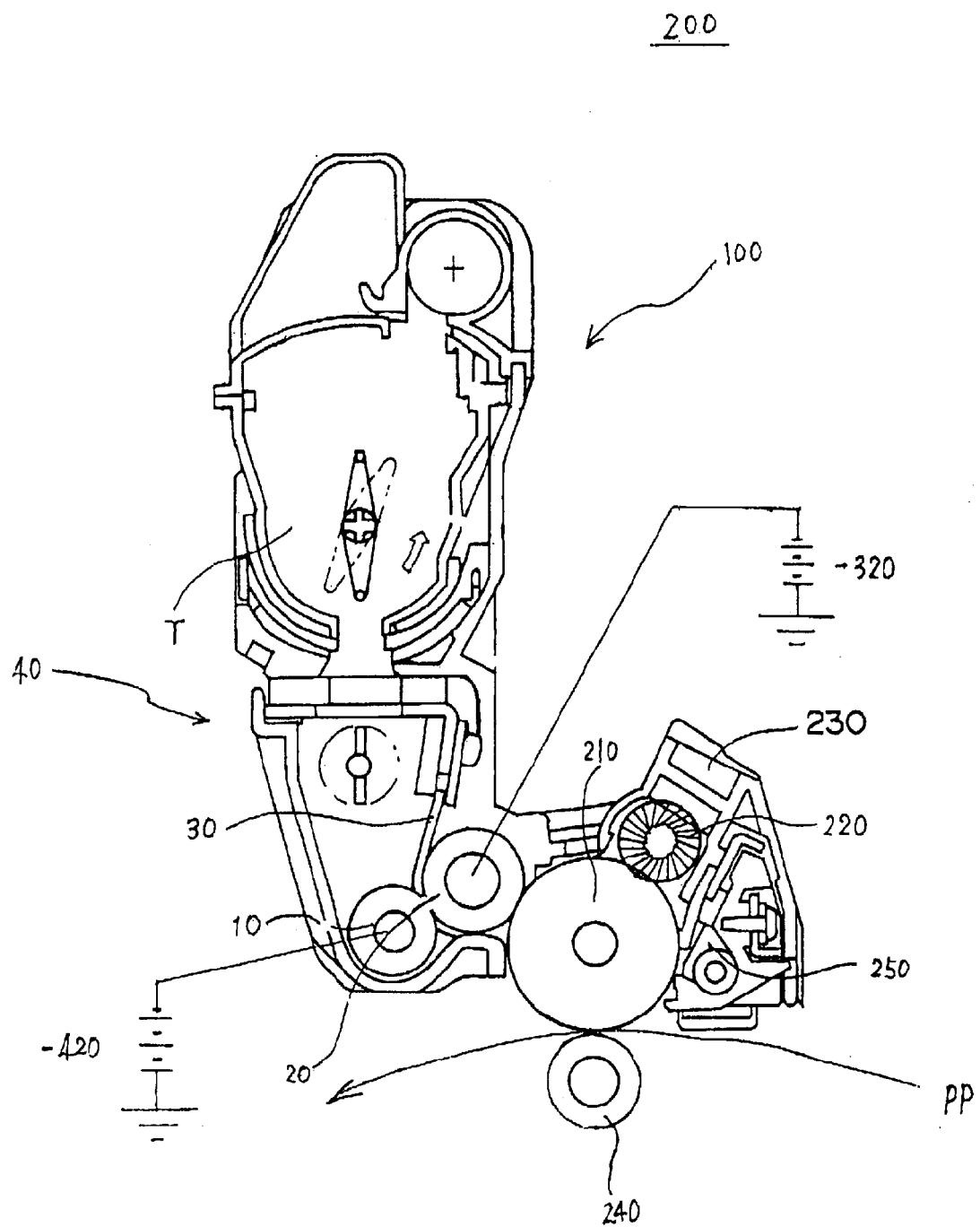
FIG. 1 is a sectional view of a principal part of the development device and image-forming device according to the present invention.

Referring now to FIG. 1, a description will be given of a development device 100 and an image-forming device 200 having the development device 100. In each figure, those elements designated by the same reference numerals denote the same elements, and a duplicate description thereof will be omitted. Hereupon, FIG. 1 is a schematic sectional view of a principal part of the image-forming device 200 including the development device 100. The development device 100 includes a reset roller 10, a development roller 20, a (doctor) blade 30, a frame 40, and a development bias power supply 50.

The reset roller 10, which is also called a supply roller or application roller, comes into contact with the development roller 20, and supplies a developer T stored in the frame 40 to the development roller 20. The reset roller 10 is made of a sponge or the like which has electrical conductivity so as to charge the developer T by friction between the developer T and the development roller 20. In the present embodiment as shown in FIG. 1, the reset roller 10 rotates to the left (counterclockwise), and is in contact with the development roller 20. With this contact and rotation, the developer T is charged, and supplied to the development roller 20. The reset roller 10 may also serve to collect the residual developer T unused for the development and left on the development roller 20. Upon collecting the toner (developer) T, the contact of the rollers 10 and 20 is utilized for scraping the developer T on the development roller 20 and returning the developer T into the frame 40.

The development roller 20, which is in contact with a photosensitive drum 210, adsorbs the toner T on its surface, and, as rotating, conveys the developer T onto the photosensitive drum 210. The development roller 20, for instance, rotates at a circumferential velocity 1.15 times higher than, and in the same direction as, the photosensitive drum 210. The development roller 20 is made of solid rubber (nitrile rubber or NBR) having 20 mm in diameter, and 41 degrees of hardness. The development roller 20 has the ten-point average roughness Rz of 5 $\mu$m to 12 $\mu$m inclusive (e.g., 8 $\mu$m), and is coated with a urethane resin. Such a configuration allows the blade 30 to dig in the development roller 20 as will be described later with reference to FIG. 2, and to regulate the layer thickness of the developer T.

In the present embodiment, the reset roller 10 is brought into contact with the development roller 20 with a contact depth of 1 mm, and the both rollers are rotated to the left. Accordingly, at the contact point of the reset roller 10 and the development roller 20, the surfaces of the both rollers move in the reverse direction. The reset roller 10 is configured to cover a metal shaft with conductive urethane foam, and adjusted to 20 mm in diameter, $10^7$ $\Omega$ in resistance between the shaft and foam. The rotation speeds of the reset roller 10 and the development roller 20 are both adjusted to 90 mm/s.

The blade 30 is a member serving to regulate to a predetermined thickness the developer T supplied by the reset roller 10. Further, the blade 30 sandwiches the developer T with the development roller 20, applies friction to the developer T conveyed by the development roller 20, and charges the developer T. In addition, if an electric potential is imposed on the blade 30, electric charge may be injected into the developer T through the blade 30. The blade 30 may be made of an elastic body typified by urethane, etc., metal having leaf spring properties such as stainless steel and bronze. A method of regulating the layer thickness of the developer T varies with these materials and includes scraping and pressing with its end or midsection. The present embodiment prepares as the blade 30 four kinds of stainless steel plate members having different thickness respectively of 0.08 mm, 0.10 mm, 0.12 mm, and 0.15 mm, and brings its end portion into contact with the development roller 20 at a predetermined line pressure.

Figure 2:
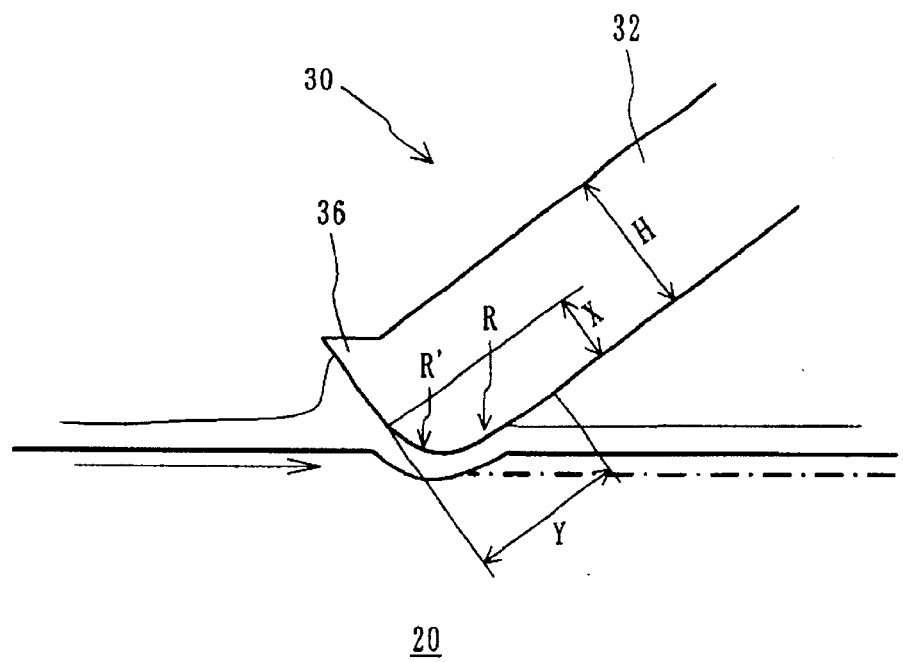
FIG. 2 is an enlarged schematic sectional view for showing a relationship between a blade and a development roller in the development device shown in FIG. 1.

The blade 30 includes a base portion 32, an end portion 34, and a molding vestigial portion 36 as shown in FIG. 2.

Hereupon, FIG. 2 is an enlarged schematic sectional view for showing a relationship between the development roller 20 and blade 30 in the development device 100. The base portion 32 has a sheet thickness t, and the end portion 34 is represented by a height X, length Y, and curvature radius R of the curve. To be accurate, the end portion 34 has a curvature radius R' (<R) at its distal end. However, the range that the curvature radius R' covers is very small, and thus the curvature radius R is regarded as the approximated curvature radius of the end portion 34 in the present embodiment. Characteristically, the blade 30 according to the present invention is distinct from the blade obtained by the manufacturing method disclosed in Japanese Laid-Open Patent Application, Publication No. 9-62096.

Figure 3:
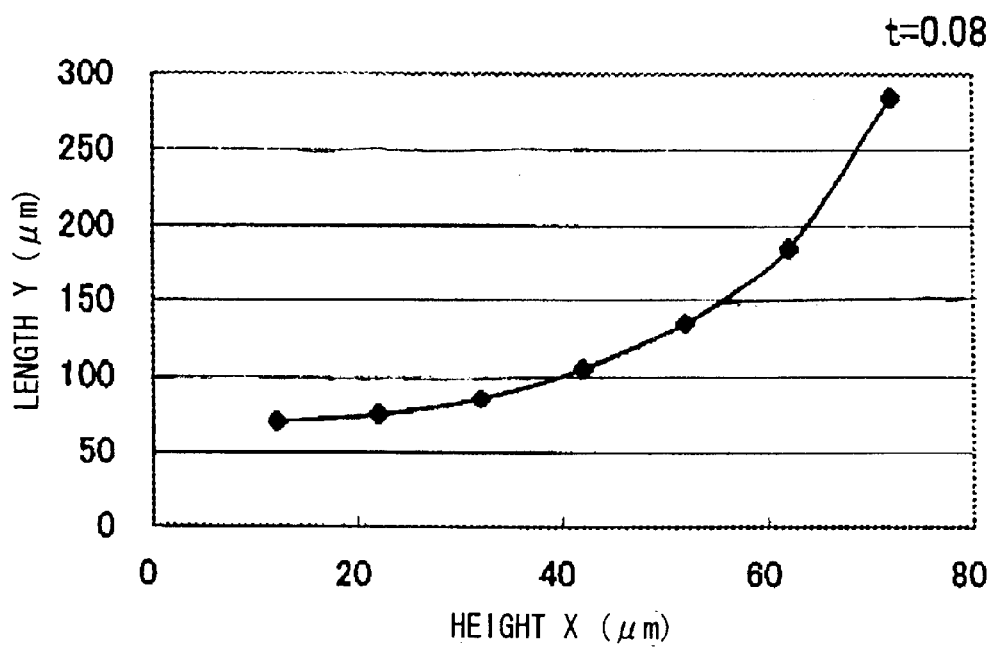
FIG. 3 is a graph showing a relationship between the height X and length Y of the curve in the end portion of the blade shown in FIG. 1, when the sheet thickness t is 0.08 mm.
Figure 4:
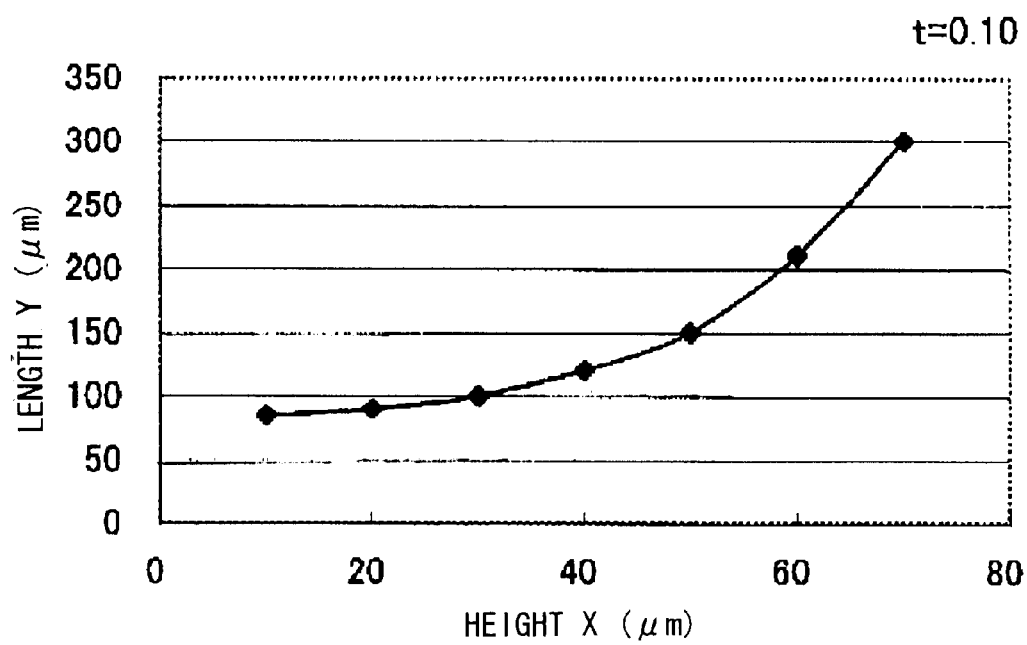
FIG. 4 is a graph showing a relationship between the height X and length Y of the curve in the end portion of the blade shown in FIG. 1, when the sheet thickness t is 0.10 mm.
Figure 5:
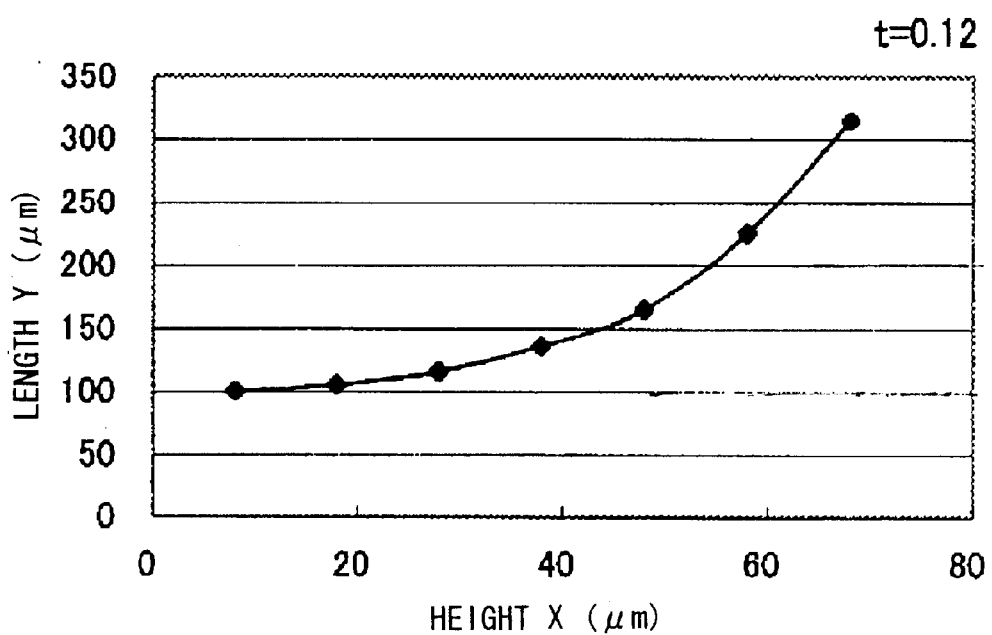
FIG. 5 is a graph showing a relationship between the height X and length Y of the curve in the end portion of the blade shown in FIG. 1, when the sheet thickness t is 0.12 mm.

First of all, in contrast to the length Y of the curve in the conventional blade which varies widely with blade materials, and thus cannot be adjusted, a specific relationship is established of the length Y to the height X for each sheet thickness t in the blade 30 in the present embodiment. Such a relationship is shown in FIGS. 3 to 5 inclusive. FIG. 3 shows a relationship between the height X and the length Y when the sheet thickness t is 0.08 mm. FIG. 4 shows a relationship between the height X and the length Y when the sheet thickness t is 0.10 mm. FIG. 5 shows a relationship between the height X and the length Y when the sheet thickness t is 0.12 mm. These graphs shown in FIGS. 3 to 5 are such as conventionally could not be obtained. In the blade 30 of the present embodiment, the length Y, where the height X assumes a certain value and the sheet thickness t assumes a certain value, can be determined from the graphs shown in FIGS. 3 to 5. Accordingly, since the height X does not vary even if it is worn out, comparing an actually measured value of the length Y with that value obtained from the graphs would provide information from which we could easily know whether the blade 30 has been worn out, or not.

Figure 18:
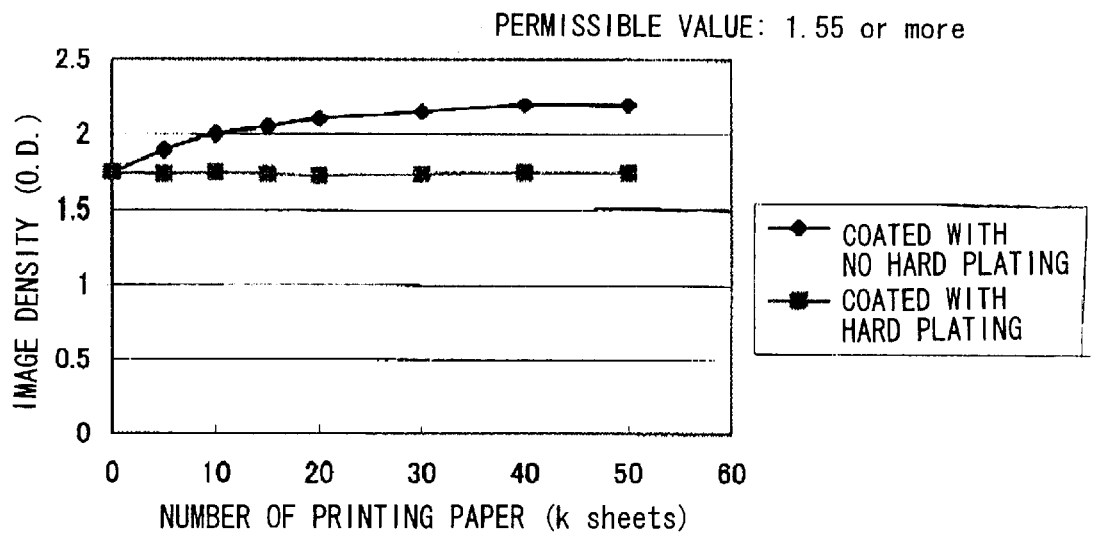
FIG. 18 is a graph plotted for comparing a relationship between the number of sheets of printed paper and the image density when the blade shown in FIG. 1 includes a hard plating layer, with the relationship when the blade includes no hard plating layer and thus has lower hardness than inorganic fine particles contained in developer T.
Figure 29:
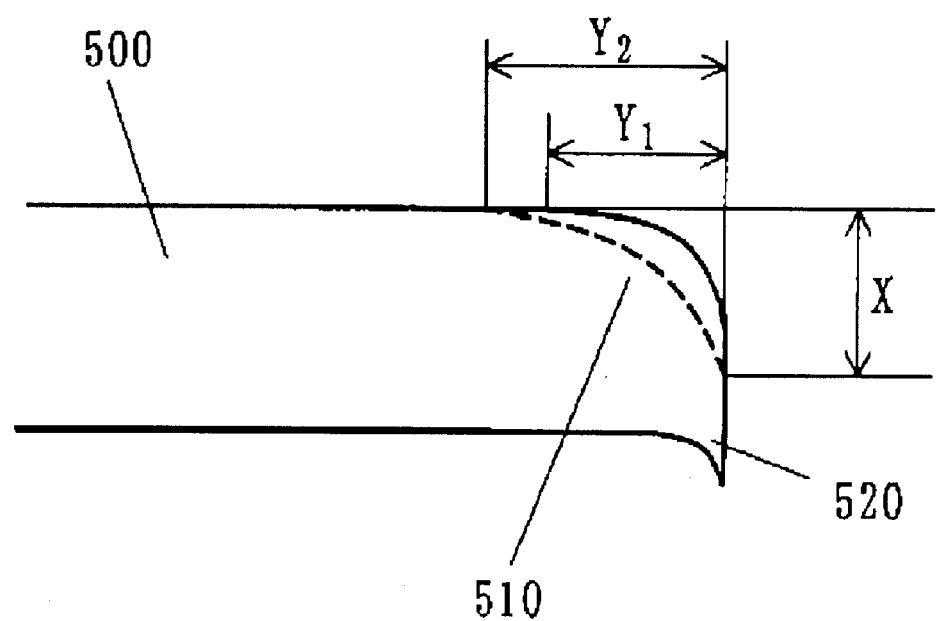
FIG. 29 is a schematic partially enlarged section of the conventional blade.

Next, unlike the conventional blade 500 shown in FIGS. 18 and 29 that includes burrs 520, the blade 30 in the present embodiment includes few burrs, and includes a molding vestigial portion 36. The blade 500 is formed in such a manner as to serve the purpose of forming the end portion 510 from a shear drop by widening a clearance between the die and punch. On the other hand, the larger the clearance, the larger the burr 520 becomes, and is therefore produced inevitably if any attempt is made to form the end portion 510 utilizing a shear drop. In contrast, upon forming the blade 30, few burrs are produced because the clearance is reduced to a minimum close to zero. In the blade 30, instead, is formed the molding vestigial portion 36 which is produced from the blade material embedded in a groove of a knockout that will be described later.

Figure 6:
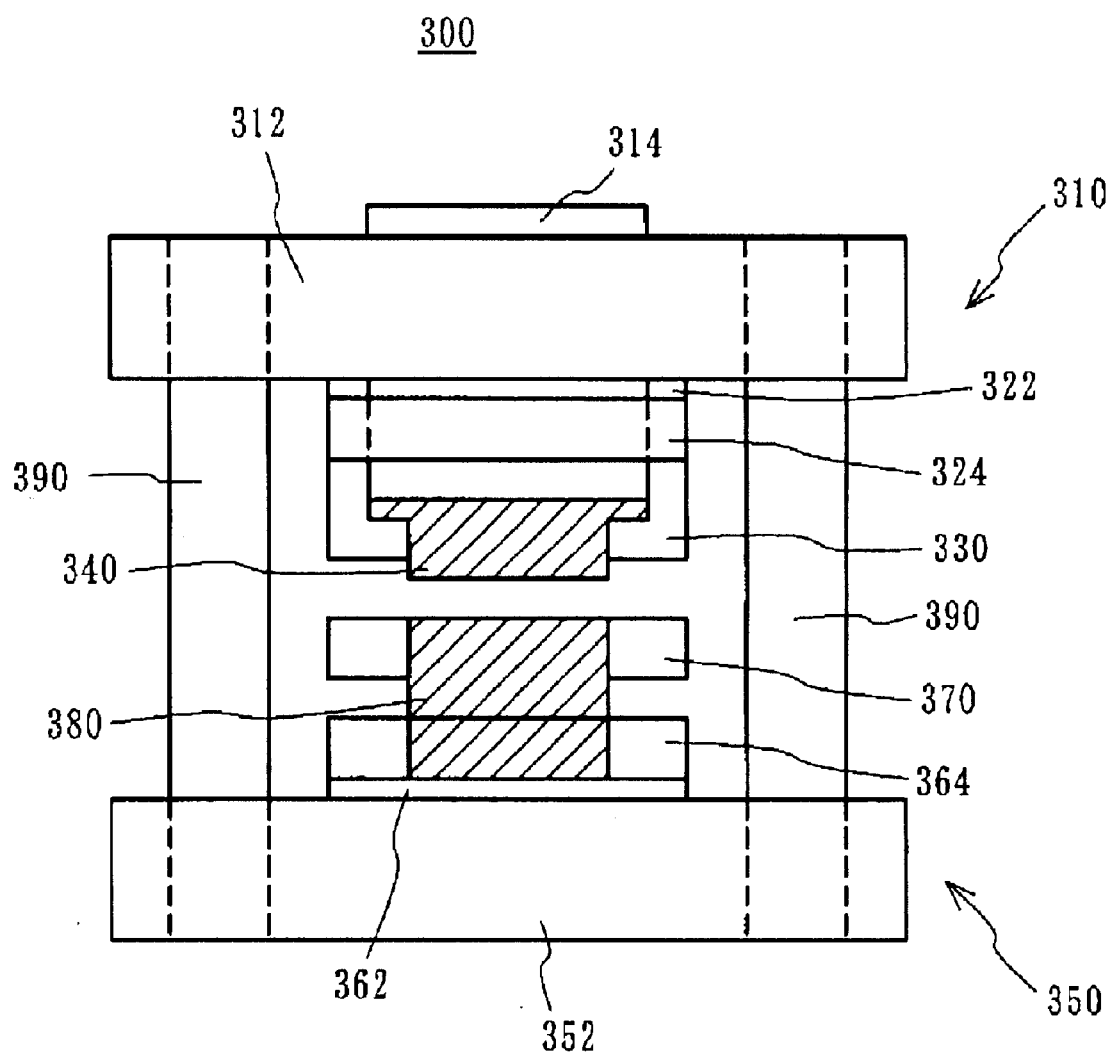
FIG. 6 is a schematic sectional view of the stamping die that is used for manufacturing the blade shown in FIG. 1.

A description will now be given of the manufacturing method of the blade 30. The blade 30 is molded with a stamping die 300 shown in FIG. 6. Hereupon, FIG. 6 is a schematic sectional view of the stamping die 300 for manufacturing the blade 30. The stamping die 300 includes an upper mold portion 310, a lower mold portion 350, and a guidepost 390. The upper mold portion (male) 310 and lower mold portion (female) 350 are connected via the guidepost 390, and relatively movable. In the present embodiment, the lower mold portion 350 is fixed, and the upper mold portion 310 is movable.

Figure 7:
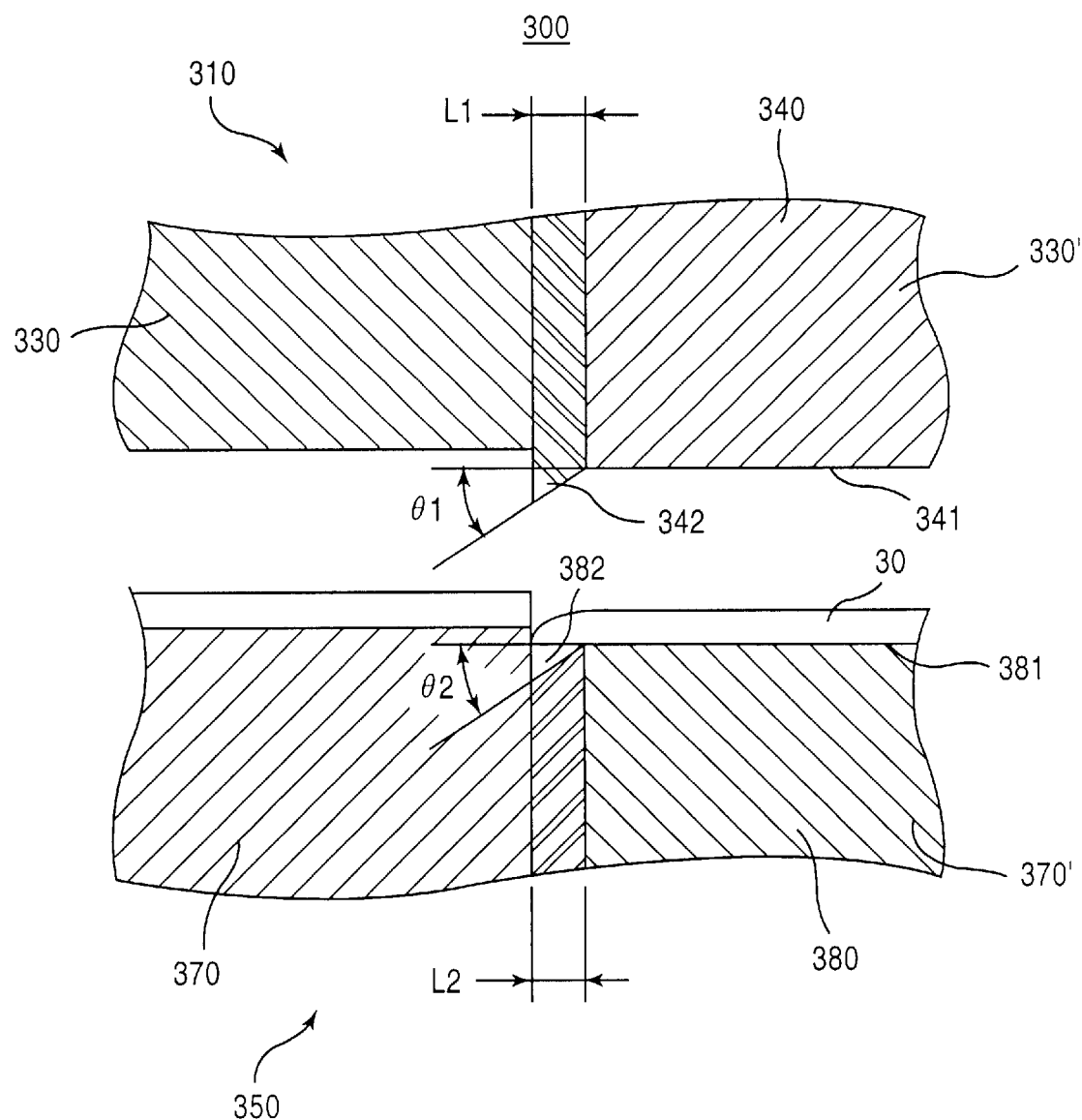
FIG. 7 is a partially enlarged sectional view of the stamping die shown in FIG. 6.

The upper mold portion 310 includes a die set 312, a shank 314, a packing plate 322, a die plate 324, a die 330, and a knockout 340. The lower mold portion 350 includes a die set 352, a packing plate 362, a punch plate 364, a stripper 370, and a punch 380. Since basic structures and operations of these elements are known in the art, following is a description of the elements related to the present invention, i.e., the die 330, knockout 340, stripper 370, and punch 380, which will be given with reference to FIG. 7. FIG. 7 is a partially enlarged sectional view of the stamping die 300 shown in FIG. 6.

The die 330 and the knockout 340 are relatively movable, and the stripper 370 and the punch 380 are also relatively movable. The knockout 340 includes a flat portion 341, and a projection portion 342 that projects at an angle $\theta_1$ from the flat portion 341. The punch 380 includes a flat portion 381, and a groove portion that is recessed at an angle $\theta_2$ from the flat portion 381. The projection portion 342 has the side L1 adjacent to $\theta_1$, and the groove portion 382 has the side L2 adjacent to $\theta_2$. The projection portion 342 and the groove portion 382 are different in dimension. To be more specific, $\theta_2 < \theta_1$, preferably $\theta_1 = \theta_2 +$ about 5°, and more preferably $\theta_1 = \theta_2 +$ about 2°. Such a restriction on the angles is placed for preventing the knockout 340 from cracking. The angles in the present embodiment are set as follows: $\theta_1 = 27°$, and $\theta_2 = 25°$.

In operation, a metal sheet for forming a blade is placed on the lower mold portion 350. Thereafter, the upper mold portion 310 moves down toward the lower mold portion 350. The knockout 340 is then so positioned as to allow the flat portion 341 thereof to project downwardly below the die 310. Subsequently, the knockout 340 moves down toward the punch 380. As a result, the metal sheet is cut off into the blade 30. Since the projection portion 342 and the groove portion 382 have different dimensions as disclosed in the present embodiment, the end portion 34 is formed at an upper side of the blade 30 in FIG. 7, and is not shaped like a molding vestigial portion 36 (i.e., triangular in section so as to correspond to the groove portion 382), but assumes a curve in section. The punch is so positioned in advance as to allow the flat portion 381 thereof to be recessed downwardly below the stripper 370. The knockout 340 then moves upward, the punch 380 moves downward, and the blade and pieces of the metal sheet that has been cut away are taken out.

Figure 8:
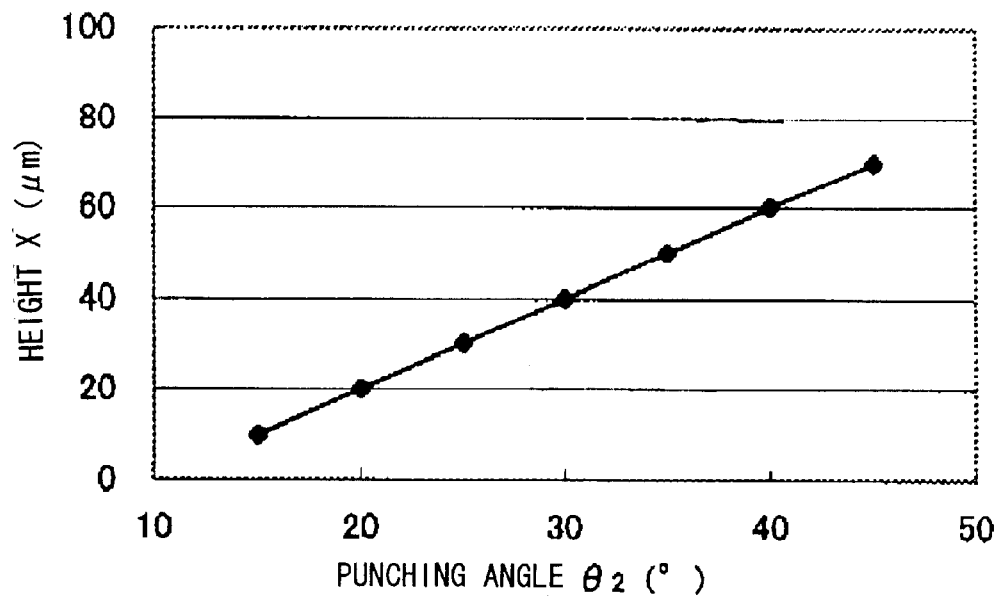
FIG. 8 is a graph showing a relationship between the height X of the curve in the end portion of the blade shown in FIG. 2 and the punching angle $\theta_1$ of the die shown in FIG. 7, when $\theta_1=\theta_2+2°$, sheet thickness t=0.10, hardness of the blade material HV=340 degrees, and clearance=0.01 mm.
Figure 9:
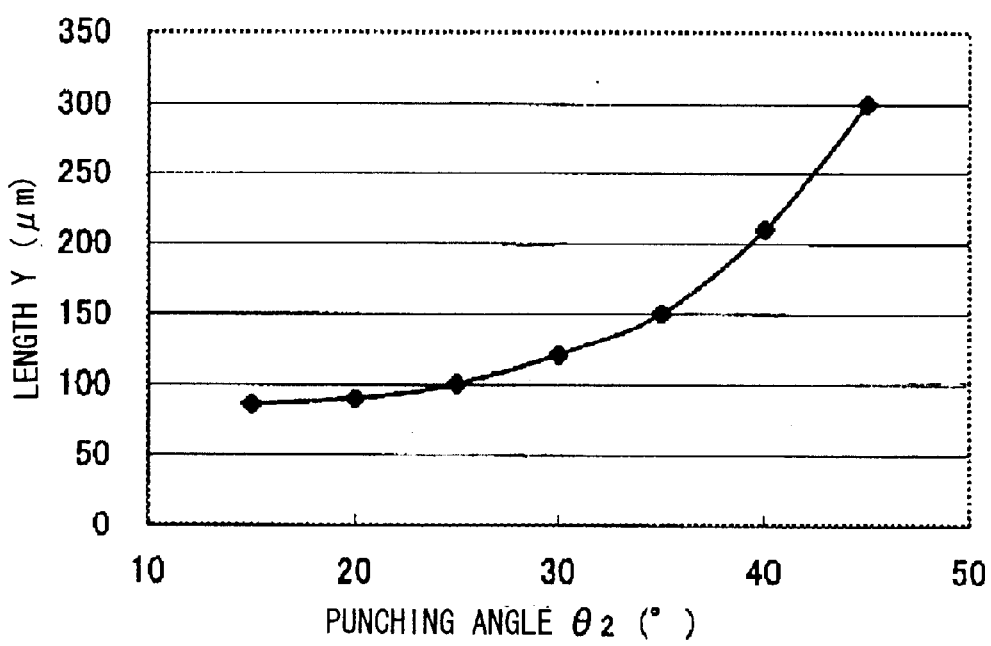
FIG. 9 is a graph showing a relationship between the length Y of the curve in the end portion of the blade shown in FIG. 2 and the punching angle $\theta_1$ of the die shown in FIG. 7, when $\theta_1=\theta_2+2°$, sheet thickness t=0.10, hardness of the blade material HV=340 degrees, and clearance=0.01 mm.
Figure 10:
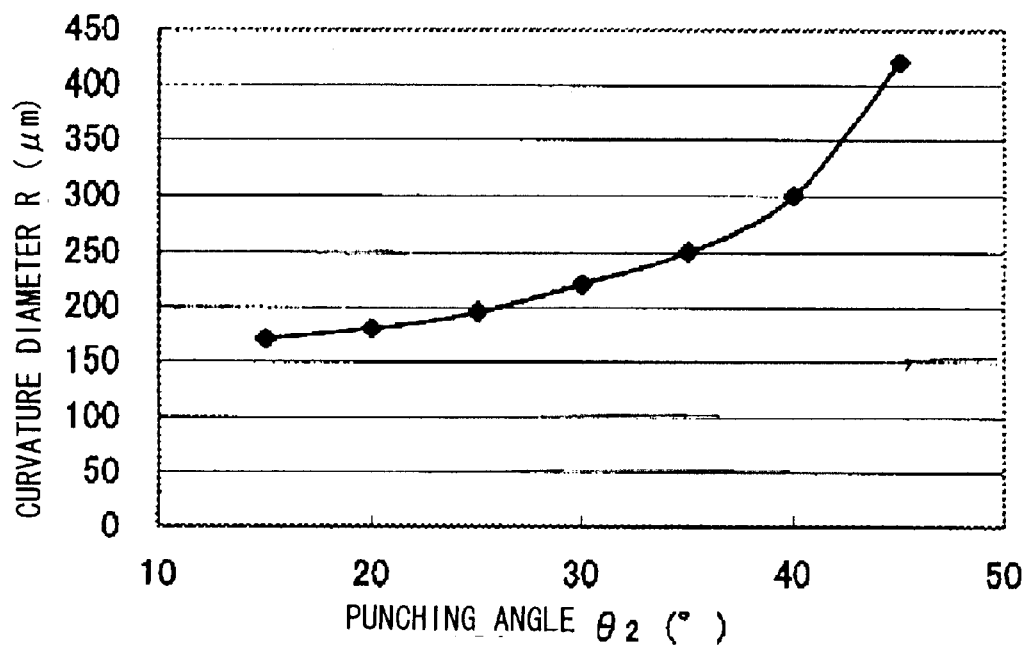
FIG. 10 is a graph showing a relationship between the curvature radius R of the curve in the end portion of the blade shown in FIG. 2 and the punching angle $\theta_1$ of the die shown in FIG. 7, when $\theta_1=\theta_2+2°$, sheet thickness t=0.10, hardness of the blade material HV=340 degrees, and clearance=0.01 mm.

The height X, length Y, and curvature radius R of the curve in the end portion 32 of the blade 30 respectively have a specific relationship with the punching angle $\theta_2$ as shown in FIGS. 8 to 10 inclusive, where $\theta_1 = \theta_2 + 2°$, sheet thickness t=0.10 mm, hardness of the blade material HV=340 degrees, clearance=0.01 mm. TABLE 1 below provides a summary of the resultant values shown in FIGS. 8 to 10 inclusive. FIG. 8 is a graph showing the dependence of the height X of the curve in the end portion 34 of the blade 30 upon the punching angle $\theta_2$. As shown in the figure, the height X is roughly proportional to the punching angle $\theta_2$. FIG. 9 is a graph showing the dependence of the length Y of the curve in the end portion 34 of the blade 30 upon the punching angle $\theta_2$. As shown in the figure, the relationship between the length Y and the punching angle $\theta_2$ is represented graphically by a specific curve. FIG. 10 is a graph showing the dependence of the curvature radius R of the curve in the end portion 34 of the blade 30 upon the punching angle $\theta_2$. As shown in the figure, the relationship between the curvature radius R and the punching angle $\theta_2$ is represented graphically by a specific curve. Since the length Y cannot be determined in the conventional method, at least the graph in FIG. 9 cannot be obtained, but in the inventive method of manufacturing the blade 30, the punching angle $\theta_2$ corresponding to a desired value of the length Y can be determined from the graph shown in FIG. 9. As a result, the blade 30 including the end portion 34 having a desired value of the length Y can be reliably manufactured by adjusting the punching angle $\theta_2$.

TABLE 1

| Punching Angle $\theta_2$ | Height X | Length Y | Curvature Radius R |
|---|---|---|---|
| 15 | 10 | 85 | 170 |
| 20 | 20 | 90 | 180 |
| 25 | 30 | 100 | 195 |
| 30 | 40 | 120 | 220 |
| 35 | 50 | 150 | 250 |
| 40 | 60 | 210 | 300 |
| 45 | 70 | 300 | 420 |

TABLE 2 shows a respective relationship of the height X, length Y, and curvature radius R of the curve in the end portion 32 of the blade 30 with the punching angle $\theta_2$, where $\theta_1 = \theta_2 + 2°$, sheet thickness t=0.10 mm, hardness of the blade material HV=340 degrees, clearance=0.005 mm. As shown in the table, an adjustment to the clearance at 0.005 mm allows the curve in the end portion 32 to have the length Y of so small dimension as cannot be formed if the clearance= 0.01 mm.

TABLE 2

| Punching Angle $\theta_2$ | Height X | Length Y | Curvature Radius R |
|---|---|---|---|
| 15 | 5 | 40 | 130 |
| 20 | 15 | 45 | 140 |
| 25 | 25 | 55 | 160 |
| 30 | 35 | 75 | 180 |
| 35 | 45 | 105 | 210 |
| 40 | 55 | 165 | 260 |
| 45 | 65 | 255 | 360 |

Figure 11:
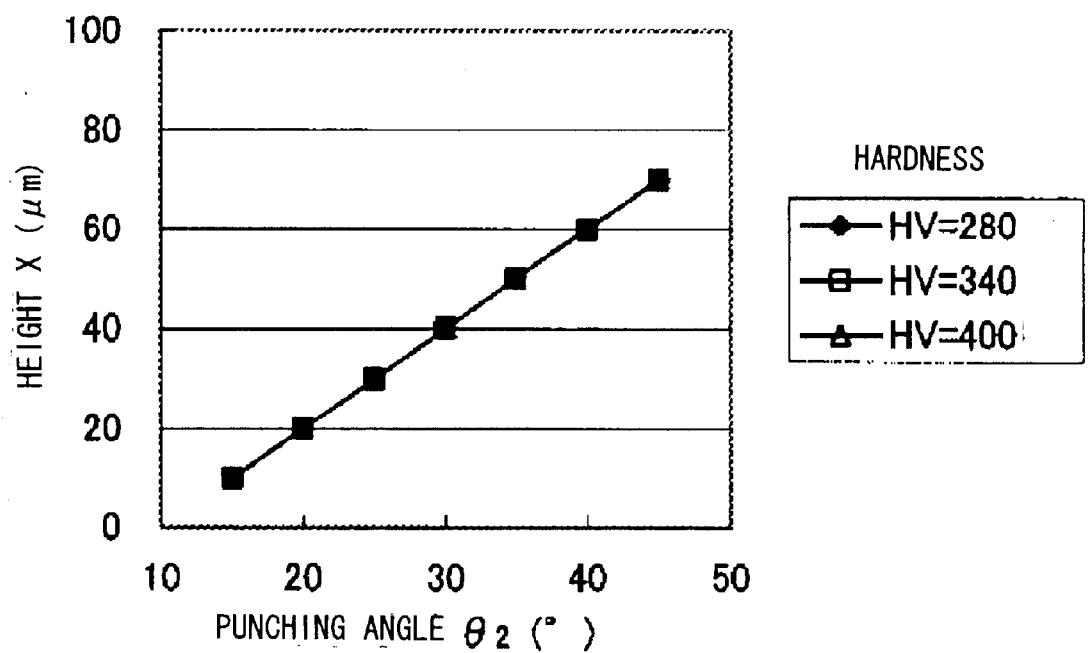
FIG. 11 is a graph showing a relationship between the height X of the curve in the end portion of the blade shown in FIG. 2 and the punching angle $\theta_1$ of the die shown in FIG. 7, when $\theta_1=\theta_2+2°$, sheet thickness t=0.10, and clearance=0.01 mm.
Figure 12:
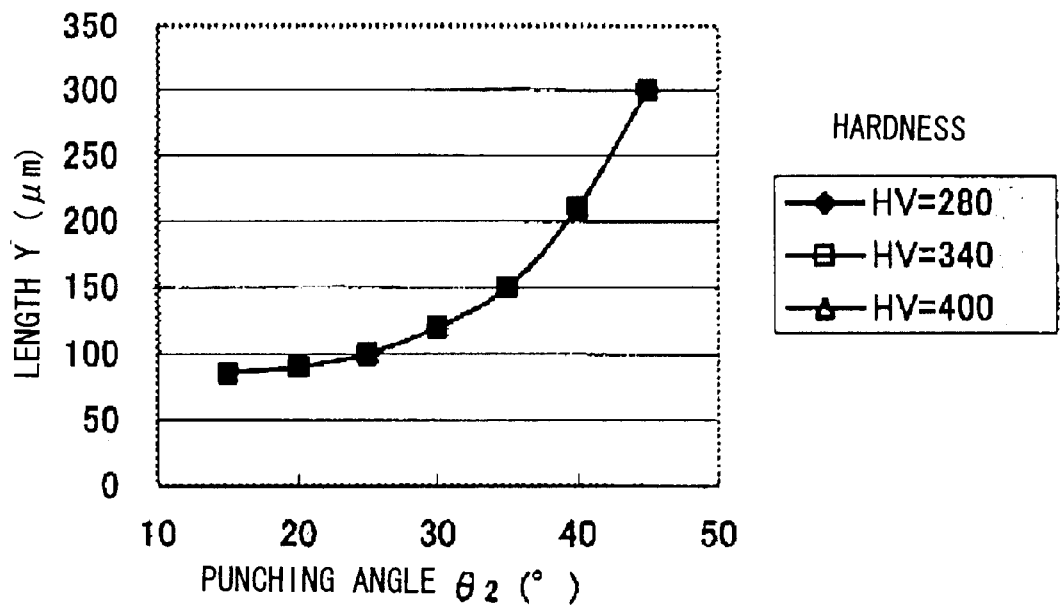
FIG. 12 is a graph showing a relationship between the length Y of the curve in the end portion of the blade shown in FIG. 2 and the punching angle $\theta_1$ of the die shown in FIG. 7, when $\theta_1=\theta_2+2°$, sheet thickness t=0.10, and clearance=0.01 mm.

The height X, length Y of the curve in the end portion 34 of the blade 30 are kept substantially constant as shown in FIGS. 11 and 12, if the punching angle $\theta_2$ is invariant, irrespective of the hardness of the blade material. TABLE 3 provides a summary of the resultant values shown in FIGS. 11 and 12. FIG. 11 is a graph showing the dependence of the height X of the curve in the end portion 34 of the blade 30 upon the punching angle $\theta_2$, for each hardness, where $\theta_1 = \theta_2 + 2°$, sheet thickness t=0.10 mm, clearance=0.01 mm. As shown in the figure, for the blade materials each having hardness HV of 280 degrees, 340 degrees, and 400 degrees, almost the same relationship (proportionality) is established between the height X of the curve in the end portion 34 of the blade 30, and the punching angle $\theta_2$. FIG. 12 is a graph showing the dependence of the length Y of the curve in the end portion 34 of the blade 30 upon the punching angle $\theta_2$, for each hardness, where $\theta_1 = \theta_2 + 2°$, sheet thickness t=0.10 mm, clearance=0.01 mm. As shown in the figure, for the blade materials each having hardness HV of 280 degrees, 340 degrees, and 400 degrees, almost the same relationship (proportionality) is established between the height X of the curve in the end portion 34 of the blade 30, and the punching angle $\theta_2$. As a result, according to the inventive method of manufacturing the blade 30, the blade 30 including the end portion 34 having a desired value of the height X and length Y can be reliably manufactured by adjusting the punching angle $\theta_2$, irrespective of the hardness of the blade material.

TABLE 3

| Angle | HV = 280 degrees | | HV = 340 degrees | | HV = 400 degrees | |
|---|---|---|---|---|---|---|
| $\theta_2$ | Height X | Length Y | Height X | Length Y | Height X | Length Y |
| 15 | 10 | 85 | 10 | 85 | 10 | 85 |
| 20 | 20 | 90 | 20 | 90 | 20 | 90 |
| 25 | 30 | 100 | 30 | 100 | 30 | 100 |
| 30 | 40 | 120 | 40 | 120 | 40 | 120 |
| 35 | 50 | 150 | 50 | 150 | 50 | 150 |
| 40 | 60 | 210 | 60 | 210 | 60 | 210 |
| 45 | 70 | 300 | 70 | 300 | 70 | 300 |

Figure 13:
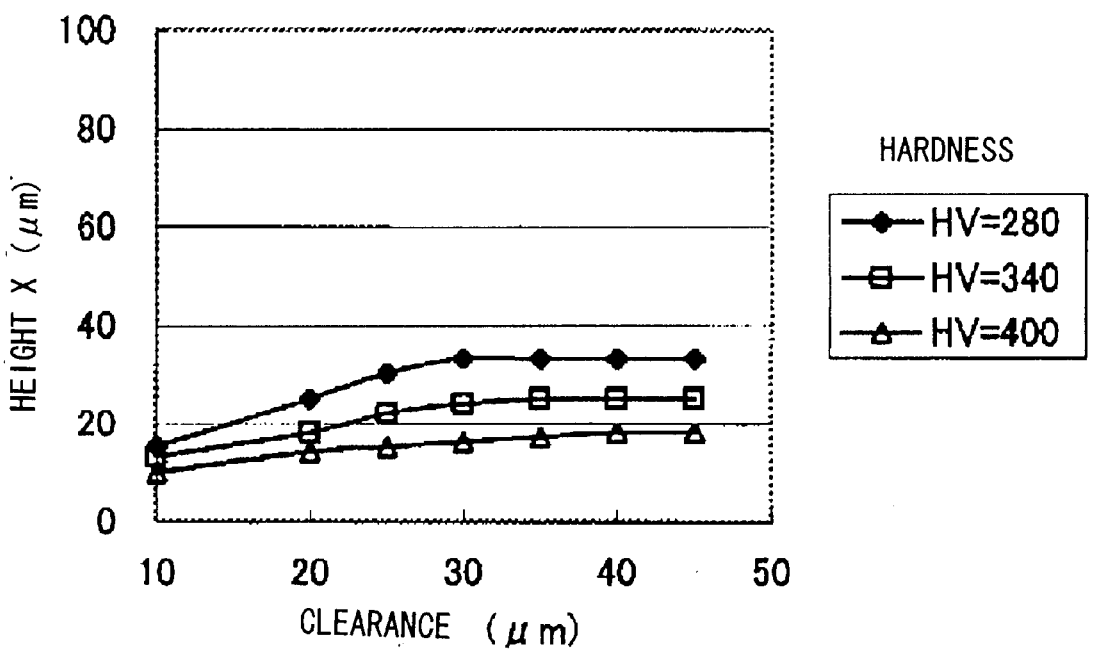
FIG. 13 is a graph showing a relationship between the height X of the curve in the end portion of the blade and the clearance between the die and the punch by hardness of the blade material, in which the end portion is manufactured by the conventional method of manufacturing the blade.

FIG. 13 and TABLE 4 show the dependence of the height X of the curve in the end portion 510 upon the clearance between the die and the punch for each hardness of the blade material, according to the manufacturing method as disclosed in Japanese Laid-Open Patent Application, Publication No. 9-62096. As shown in the figure, for the blade materials each having a different value of the hardness HV of 280 degrees, 340 degrees, and 400 degrees, the height X is not kept constant, even if the clearance is invariant. Consequently, the manufacturing method in the publication is different; in that the height X cannot be regulated by the clearance if the hardness of the blade material varies, from the inventive manufacturing method shown in FIG. 11 that can regulate the height X by the punching angle $\theta_2$ despite varied hardness of the blade material. Moreover, the manufacturing method in the publication is different, in that the length Y cannot be regulated by the clearance, from the inventive manufacturing method shown in FIG. 12 that can regulate the length Y by the punching angle $\theta_2$ despite varied hardness of the blade material.

TABLE 4

Figure 14:
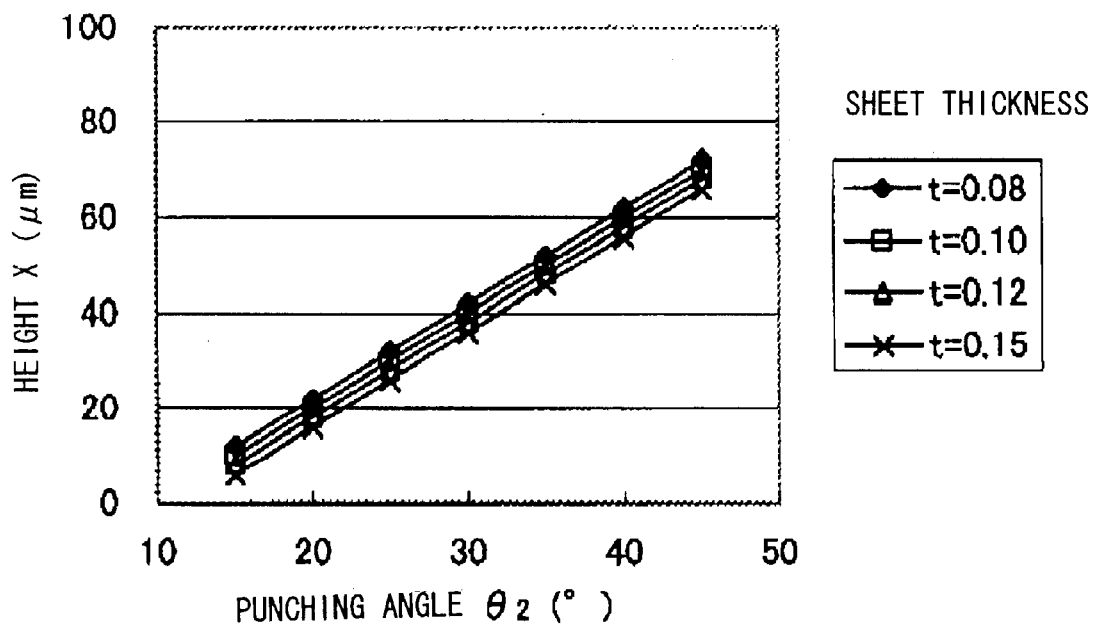
FIG. 14 is a graph showing a relationship between the height X of the curve in the end portion of the blade shown in FIG. 2 and the punching angle $\theta_2$ of the die shown in FIG. 7, when hardness of the blade material HV=340 degrees, clearance=0.01 mm, and sheet thickness t varies.
Figure 15:
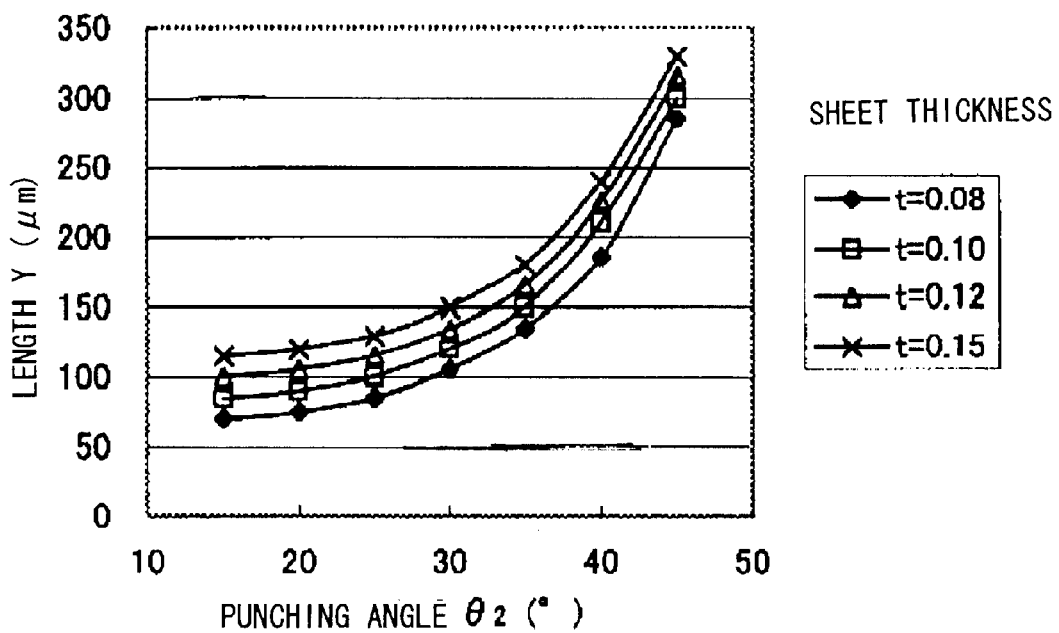
FIG. 15 is a graph showing a relationship between the length Y of the curve in the end portion of the blade shown in FIG. 2 and the punching angle $\theta_2$ of the die shown in FIG. 7, when hardness of the blade material HV=340 degrees, clearance=0.01 mm, and sheet thickness t varies.

| Clearance | HV = 280 degrees | HV = 340 degrees | HV = 400 degrees |
|---|---|---|---|
| 10 | 15 | 13 | 10 |
| 20 | 25 | 18 | 14 |
| 25 | 30 | 22 | 15 |
| 30 | 33 | 24 | 16 |
| 35 | 33 | 25 | 17 |
| 40 | 33 | 25 | 18 |
| 45 | 33 | 25 | 18 |

Where the hardness of the blade material is constant (HV=340 degrees), clearance=0.01 mm, and the sheet thickness t of the blade 30 varies, a relationship between the height X and the punching angle $\theta_2$ is shown in FIG. 14, and a relationship between the length Y and the punching angle $\theta_2$ is shown in FIG. 15. TABLE 5 below provides a summary of the resultant values in these figures. As shown in FIG. 14, the height X is roughly proportional to the punching angle $\theta_2$ for the sheet thickness t of different values of 0.08 mm, 0.10 mm, 0.12 mm, and 0.15 mm, and the height X, where the punching angle $\theta_2$ is kept constant, exhibits a higher value, as the sheet thickness t exhibits a lower value. In contrast, as shown in FIG. 15, the length Y is roughly proportional to the punching angle $\theta_2$ for the sheet thickness t of different values of 0.08 mm, 0.10 mm. 0.12 mm, and 0.15 mm, and the length Y, where the punching angle $\theta_2$ is kept constant, exhibits a lower value, as the sheet thickness t exhibits a lower value. According to the manufacturing method disclosed in Japanese Laid-Open Patent Application, Publication No. 9-62906, the length Y cannot be determined, and thus a graph corresponding to that shown in FIG. 15 (i.e., the graph in which the horizontal axis indicates clearances) cannot be obtained.

TABLE 5

| | t = 0.08 | | t = 0.10 | | t = 0.12 | | t = 0.15 | |
|---|---|---|---|---|---|---|---|---|
| $\theta_2$ | Height X | Length Y | Height X | Length Y | Height X | Length Y | Height X | Length Y |
| 15 | 12 | 70 | 10 | 85 | 8 | 100 | 6 | 115 |
| 20 | 22 | 75 | 20 | 90 | 18 | 105 | 16 | 120 |
| 25 | 32 | 85 | 30 | 100 | 28 | 115 | 26 | 130 |
| 30 | 42 | 105 | 40 | 120 | 38 | 135 | 36 | 150 |
| 35 | 52 | 135 | 50 | 150 | 48 | 165 | 46 | 180 |
| 40 | 62 | 185 | 60 | 210 | 58 | 225 | 56 | 240 |
| 45 | 72 | 285 | 70 | 300 | 68 | 315 | 66 | 330 |

The frame 40 stores the developer T, supplies the same to the reset roller 10, and receives the toner (developer) T collected by the reset roller 10. The frame 40 includes a puddle, an agitator, and other components (not shown), and is connectible with an external toner storage container such as a toner cartridge.

The developer T may be selected from nonmagnetic monocomponent developers that are in common use, and was prepared by kneading fine carbon particles as a colorant and a charge control agent with a polyester resin, and pulverized into a predetermined volume average particle diameter. Optionally, an offset inhibitor made of low-molecular material such as wax, polyethylene, and polypropylene may be used for (included in) the developer T if necessary. Thereafter, a powder smaller than 3 $\mu$m and coarse particles equal to or larger than 20 $\mu$m were removed, and the remaining particles were externally added and coated at its surface with fine particles of silicon dioxide and titanium dioxide to provide fluidity and charge. This developer T has such thermal characteristics that its glass transition temperature ranges between 55 and 67° C., and its melting point ranges between 120 and 150° C. A large gap between the glass transition temperature and the melting point is due to its broad range of a coating ratio of external additives, a molecular distribution and cross-linking degree of a polyester resin. The developer T having a volume average particle diameter of 8.0 $\mu$m was used in the present embodiment. The developer T is obtainable by not using the above-described pulverizing method, but using any preferred method such as a polymerization process, a spray-drying process and other powder-making processes.

The charge amount of developer T was determined by measuring a state of the toner layer TL formed on the development roller 20 using the E-spart analyzer (manufactured by Hosokawa Micron Corporation). The most desirable toner layer potential Vt in light of the toner layer formation and image quality is −15 through −40 V. The toner layer potential Vt less than −40 V would make the toner layer thin because of its low image force as a deposition force. On the contrary, the toner layer potential Vt more than −15 V would raise its image force and lowers the development efficiency. Moreover, since the higher potential would make it difficult to regulate the toner, the surface roughness of the development roller 20 need be made small while the blade (line) pressure need be made high.

The blade 30 exhibits preferably higher hardness than an inorganic fine particle such as an external additive added to improve fluidity of toner, more preferably higher hardness by at least one on Mohs scale than the inorganic fine particle. This is for the purpose of preventing the blade 30 from wearing out. Particularly, in recent image-forming devices 200 that is required to achieve high-speed printing operation, the development roller 20 rotates at high speed, and thus an increased load is likely to be imposed on the blade 30; therefore it is important to consider the optimum combination of the hardness of the blade 30 and that of the developer T.

Figure 30:
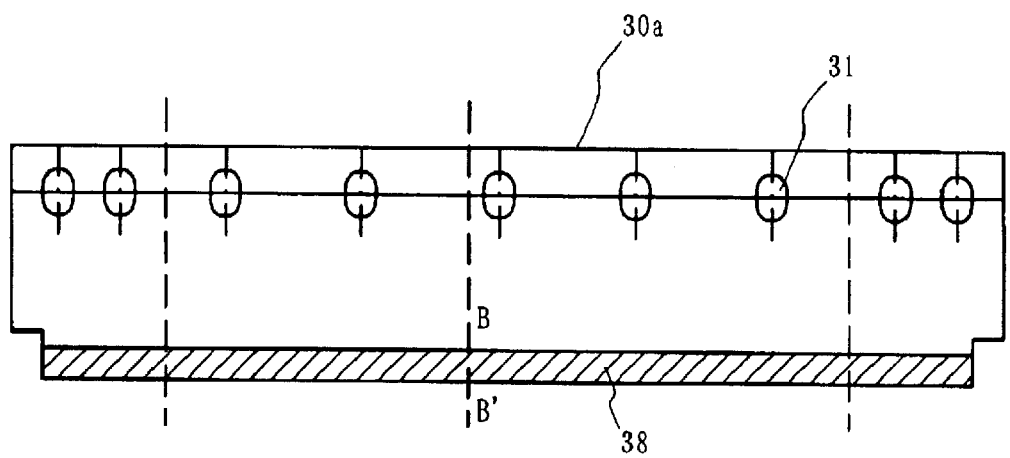
FIG. 30 is a schematic plan view of a variation of the blade shown in FIG. 1.
Figure 31:
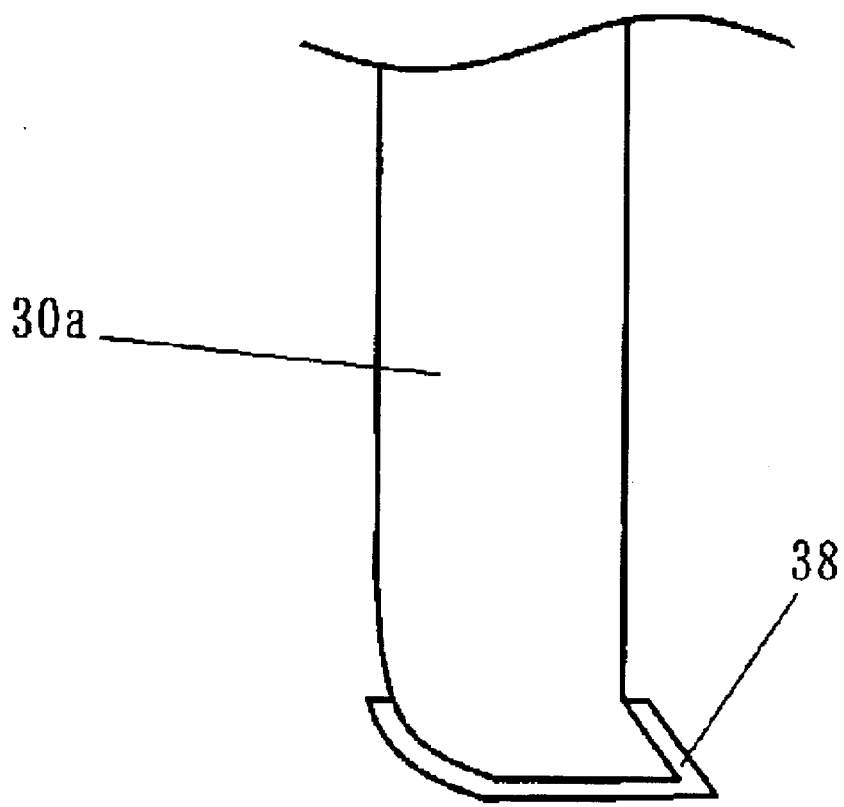
FIG. 31 is an enlarged sectional view taken along the line B—B shown in FIG. 30.

To raise the hardness of the blade 30, the blade material having high hardness may be used. Alternatively, the blade 30 may be replaced by the blade 30A shown in FIGS. 30 and 31, and the end portion 32 may partially or entirely be coated with a hard plating layer. FIG. 30 is a schematic plan view of the blade 30A as a variation of the blade 30. FIG. 31 is a cross section taken along the line B—B shown in FIG. 30. The blade 30A in the present embodiment includes in part of the end portion 32 a hard plating layer 38 that is made of chromium and has a thickness of 12 $\mu$m or smaller, preferably of 8 $\mu$m or smaller. The blade 30A is fastened on the frame 40 shown in FIG. 21 with a fastening screw 44 and a support plate 42, and includes a screw-tapped hole 31 into which the fastening screw 33 is inserted.

Chromium is not only hard but also conductive, and the blade 30 is preferably coated with a hard chrome-plating layer so as to inject charge to the developer T with potential applied through the blade 30. Chromium has the hardness of 9 on Mohs scale. For example, the external additive has the hardness of 7 on Mohs scale, and diamond, which may be used instead of chromium, is 10 on Mohs scale in hardness.

The hard plating layer 38, if formed on part of the end portion 32, works well enough. It is the end portion 32 that is partially plated because a warp and deformation of the blade 30 should be prevented, and further because electroplating over an entire surface of the blade 30 would disperse electric charge, thus causing unevenness on the hard plating layer, and take much time, thus entailing an increase in cost. Accordingly, the hard plating layer may be formed only and sufficiently on an area extending 1–5 mm, or so, from the edge whereby a spot in contact with the development roller 20 can be protected. Therefore, if the electroplating process is applied, only the edge of the blade 30 (area extending 1–5 mm from the edge to be coated with the hard plating layer) is immersed in an aqueous solution, and thereby the plating process can be completed. However, considering its manufacturability and cost efficiency, the hard plating layer may preferably be formed on an area extending 3 mm from the edge. The warp and deformation of the blade 30, and/or unevenness in thickness on the hard plating layer would cause uneven thickness of the toner layer. The thickness of the hard plating layer is set at 12 $\mu$m or smaller because thicker plating layer would make the blade 30 chapped and deprived of flexibility.

An example of usable processes of forming the hard plating layer is, though not limited to, the electroplating process. The electroplating process uses a plating processing device in which an object to be processed is immersed in an aqueous solution containing ions of the metal to be deposited, which becomes a cathode as a reduction reaction terminal, and a forward direct current is fed between the cathode and an adequate soluble or insoluble anode (oxidation reaction terminal), initiating an electrolytic deposition of a coating of the target metal on the object to be processed. First, the blade 30 and a direct current electrode are immersed so as to be opposite to each other in a cell containing metal ions, where the blade 30 is connected to a negative terminal and becomes a cathode (negative pole), and the electrode becomes an anode (positive pole). A forward current, which is fed between them, is controlled by a controller to electrodeposite a target metal coating such as chromium on the surface of the blade 30. The controller may have information obtained directly or indirectly from measurements of elapsed time after the start of feeding the electric current, current value during the feeding of the electric current, or the like, on a thickness of the plated metal layer deposited on and coating the surface of the blade 30. When the thickness of the plated metal layer is determined based upon the elapsed time after the start of feeding the electric current, and/or the current value during the feeding of the electric current, data having previously obtained through a simulation may be used. Such a simulation may be performed with consideration given to parameters such as concentrations of the metal ions, temperature of the aqueous solution, and humidity.

Figure 16:
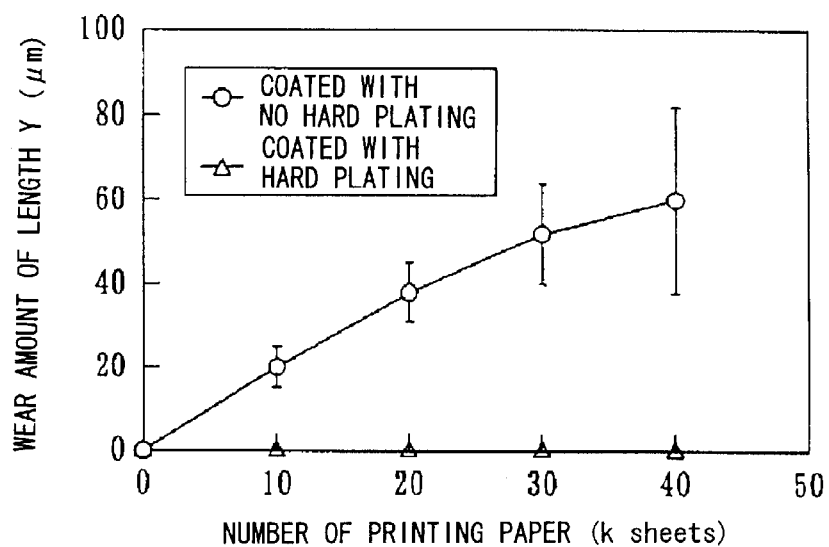
FIG. 16 is a graph plotted for comparing a relationship between the number of sheets of printed paper and the amount of wearing out of the length Y when the blade shown in FIG. 1 includes a hard plating layer, with the relationship when the blade includes no hard plating layer and thus has lower hardness than inorganic fine particles contained in developer T.

FIG. 16 shows a graph for comparing the amounts of wearing out of the length Y between the blade 30 which includes a hard plating layer (having a thickness between 2 through 5 $\mu$m), and that which includes no hard plating layer, and is lower in hardness than an inorganic fine particle (silicon dioxide in this case) contained in the developer T. As the blade material, JG-SUS304-CSP-3/4H is employed. As shown in the figure, it is understood that the blade 30 including the hard plating layer is not worn out so as to reduce the length Y, even if the number of sheets of printing paper increases. If the length Y is not reduced by wear, the capability of regulating the developer layer does not lower, whereby high-quality image formation can be maintained for a long time.

Figure 17:
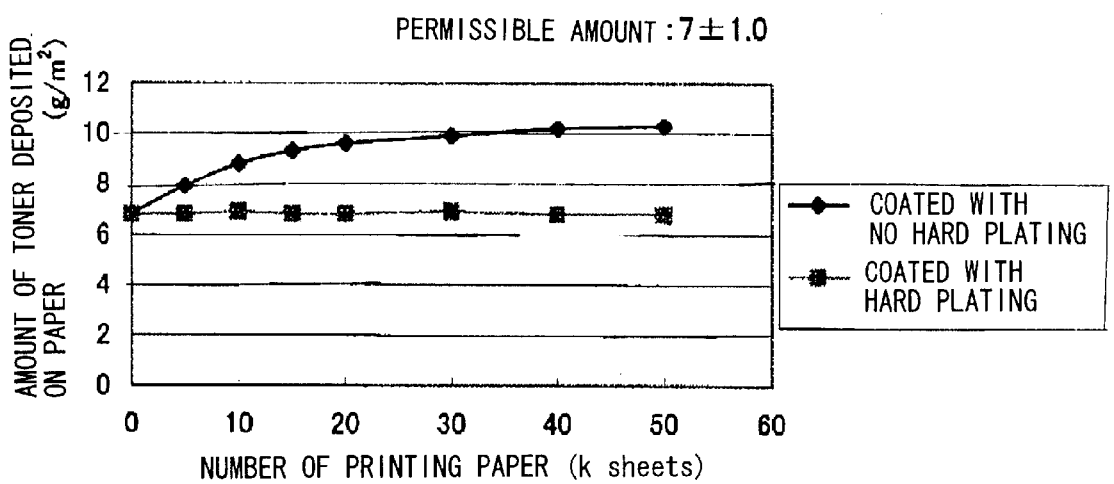
FIG. 17 is a graph plotted for comparing a relationship between the number of sheets of printed paper and the amount of toner deposited on the paper when the blade shown in FIG. 1 includes a hard plating layer, with the relationship when the blade includes no hard plating layer and thus has lower hardness than inorganic fine particles contained in developer T.
Figure 19:
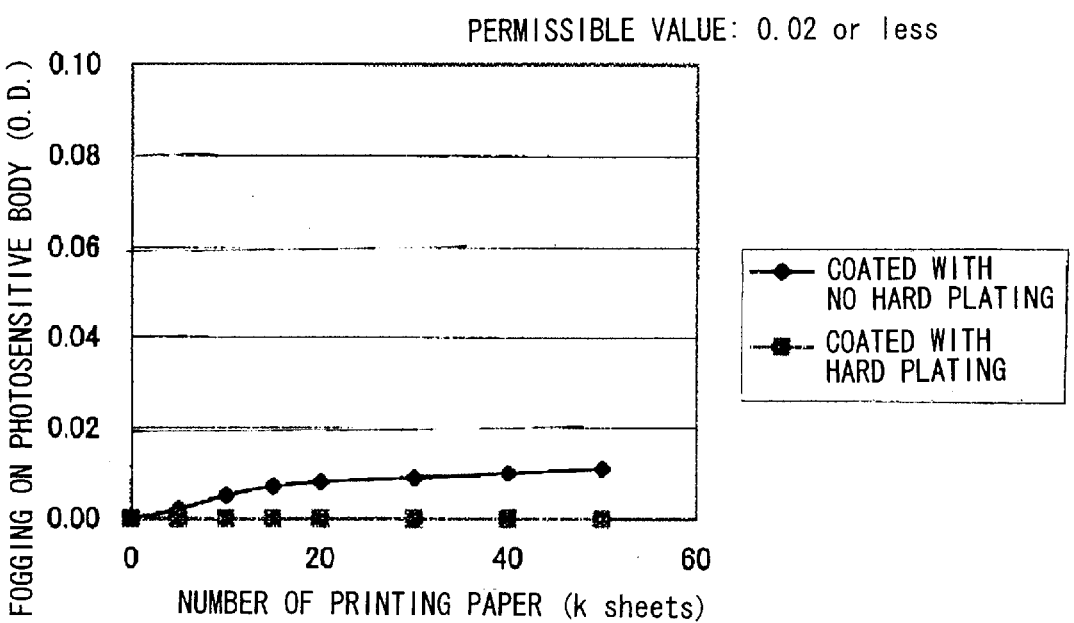
FIG. 19 is a graph plotted for comparing a relationship between the number of sheets of printed paper and the fogging when the blade shown in FIG. 1 includes a hard plating layer, with the relationship when the blade includes no hard plating layer and thus has lower hardness than inorganic fine particles contained in developer T.
Figure 20:
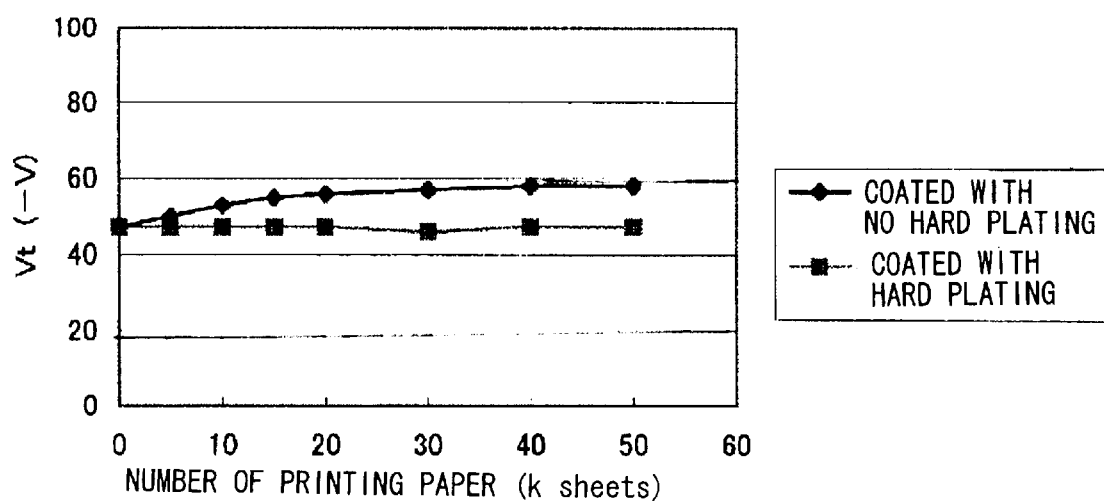
FIG. 20 is a graph plotted for comparing a relationship between the number of sheets of printed paper and the potential in the toner layer on the development roller when the blade shown in FIG. 1 includes a hard plating layer, with the relationship when the blade includes no hard plating layer and thus has lower hardness than inorganic fine particles contained in developer T.

To be more specific, as shown in FIGS. 17 through 20, it is understood that the amount of toner deposition and image density on the paper, and the potential of the toner on the development roller 20 do not lower in the blade 30 including the hard plating layer, even if the number of sheets of printed paper increases, thereby preventing fogging. The image density and fogging were measured using the O.D. meter. FIG. 17 is a graph for comparing relationships of the amount of toner deposition to the number of sheets of printed paper between the blade 30 which includes a hard plating layer, and that which includes no hard plating layer, and is lower in hardness than an inorganic fine particle contained in the developer T. FIG. 18 is a graph for comparing relationships of the image density to the number of sheets of printed paper between the blade 30 which includes a hard plating layer, and that which includes no hard plating layer, and is lower in hardness than an inorganic fine particle contained in the developer T. FIG. 19 is a graph for comparing relationships of the fogging to the number of sheets of printed paper between the blade 30 which includes a hard plating layer, and that which includes no hard plating layer, and is lower in hardness than an inorganic fine particle contained in the developer T. FIG. 20 is a graph for comparing relationships of the potential of the toner layer on the development roller to the number of sheets of printed paper between the blade 30 which includes a hard plating layer, and that which includes no hard plating layer, and is lower in hardness than an inorganic fine particle contained in the developer T.

The blade (line) pressure may be adjusted by varying three factors of a blade plate pressure, a free length corresponding to a distance from a blade support portion to a roller contact portion, and a deflection amount, using the following equation 1. In the present embodiment, the blade pressure worked out with the equation 1 is varied in a range from 10 to 100 g/cm, to determine the optimum value.

$$W = \frac{3\delta \cdot E \cdot b \cdot h^3}{12L^3} = \frac{\delta \cdot E \cdot b \cdot h^3}{4L^3} \quad (1)$$

W is a total load of the blade pressure, δ a deflection amount, E elasticity modulus, b a blade width, h a plate thickness, and L a free length.

The present inventors considered how they could stably form a uniform toner layer on the development roller 20 to obtain high image quality. Too thin toner layer would lead to reduced and varied image densities, and too thick toner layer would increase the ratio of the toner having reverse charge or low charge, and produce fogging in a no-image area. The inventors eventually arrived at the idea that the formation of the toner layer having a uniform thickness depends not only upon a shape of the end portion 32 of the blade 30, but also upon four parameters (though not limited to them) such as a surface roughness of the development roller, a blade pressure, a toner particle diameter, and a charge amount of the toner, and these parameters should be controlled in proper combination of each other.

In the present embodiment, a contact-type development process in which the development roller 20 is a resin roller, and brought into contact with the photosensitive drum 210 is adopted. However, the present invention is not intended to exclude a noncontact-type development process in which the development roller 20 is not in contact with the photosensitive drum 210.

In the present embodiment, a direct current voltage at −420V is applied to the reset roller 10 as a development voltage bias, and a direct current at −320 V is applied to the development roller 20. The voltage at the surface of the photosensitive drum 210 is set at −670 V, and the potential of the latent-image area exposed to light at −50 V or so.

The developer T is negatively charged by friction with a contact nip of the reset roller 10 and the development roller 20, and supplied by the image force as an electrostatic force and the mechanical force to the development roller 20, and deposited thereon. The developer T on the development roller 20 is excessively deposited, and thus regulated with the blade 30. Then, as described above, the thickness of the toner layer TL is controlled by the factors including the surface roughness Rz of the development roller 20, the blade (line) pressure Pb, the volume average particle diameter D and the amount of charge Vt of the developer T, so as to vary on the order of some μm to 100 μm.

The toner layer TL regulated at a predetermined thickness is fed from the development roller 20 to the photosensitive drum 210. Thereafter, the developer T is deposited onto an electrostatic latent image formed on the surface of the photosensitive drum 210, and the latent image is visualized into a toner image.

Under the above-described conditions, the toner layer TL was formed, and the effects each condition exerts on a state of the toner layer formation and image quality are presented in Tables 6 through 11.

The TABLE 6 shows the experimental results when the surface roughness on the development roller 20 was provided with a constant value of 2 μm.

TABLE 6

| Rz(μm) | Pb(gf/cm) | Vt(−V) | dt(μm) | Image Density |
|---|---|---|---|---|
| 2 | 10 | 43.5 | 12.0 | unstable toner layer formation, some fogs occurred |
| 2 | 15 | 34.6 | 10.0 | slightly low image density |
| 2 | 20 | 32.2 | 9.5 | low image density |
| 2 | 30 | 30.1 | 9.0 | low image density |
| 2 | 40 | 28.3 | 8.5 | low image density, uneven toner layer |
| 2 | 45 | 26.4 | 8.0 | low image density, uneven toner layer |
| 2 | 50 | 24.2 | 7.5 | low image density, uneven toner layer |

When the surface roughness is relatively small, the toner layer thickness dt is diminished even under a reduced blade (line) pressure Pb, and thus the image density is low. Under the lowest blade line pressure Pb (11.0 gf/cm), the developer T could not be regulated, and escaped from the blade 30. Therefore, the blade line pressure Pb is preferably a load greater than at least 15.0 gf/cm.

The formation of the toner layer TL was unstable when the toner layer thickness dt was less than 10 μm, and the image was not only lowered in density but also made inconsistent on occasions. In order to achieve a high-quality printing, the toner layer thickness dt is preferably 1.2 times larger than the toner volume average particle diameter D.

TABLE 7 shows the experimental results when the surface roughness (ten-point average roughness) Rz on the development roller was provided with a constant value of 5 μm. It turned out that the range of the blade line pressure Pb within which a good toner layer TL may be formed can be relatively broadly secured under this condition.

TABLE 7

| Rz(μm) | Pb(gf/cm) | Vt(−V) | dt(μm) | Image Density |
|---|---|---|---|---|
| 5 | 10 | 46.0 | 14.0 | unstable toner layer formation, a bit many fogs and escape from blade occurred |
| 5 | 15 | 43.0 | 12.0 | good |
| 5 | 20 | 40.0 | 11.5 | good |
| 5 | 30 | 38.0 | 11.0 | slightly low image density |
| 5 | 40 | 36.5 | 10.5 | slightly low image density |
| 5 | 45 | 34.0 | 10.0 | slightly low image density |
| 5 | 50 | 32.0 | 9.5 | slightly low image density |

TABLE 8 shows the experimental results when the surface roughness Rz on the development roller 20 was set at a constant value of 8 μm. As is the above case where the surface roughness was set at 5 μm, the toner layer TL could be adequately formed in relatively broad ranges under this condition. The range within which a good image density could be obtained was made broader than that at 5 μm. In addition, as the image density was good when the blade pressure was set at 50 gf/cm, a continuous print test was conducted. As a result, a blade fusion occurred after 16 hours. The blade fusion is a phenomenon in which heat is produced in a blade and toner, and the heat fuses the toner and bonds it to the blade. This occurred because the blade pressure Pb was too high, and a stress onto the developer T increased.

TABLE 8

| Rz (μm) | Pb(gf/cm) | Vt(-V) | dt(μm) | Image Density |
|---|---|---|---|---|
| 8 | 10 | 74.1 | 17.0 | unstable toner layer formation, some fogs and escape from blade occurred |
| 8 | 15 | 56.8 | 15.0 | good |
| 8 | 20 | 54.7 | 14.5 | good |
| 8 | 30 | 52.4 | 14.0 | good |
| 8 | 40 | 50.1 | 13.5 | good |
| 8 | 45 | 48.2 | 13.0 | good |
| 8 | 50 | 46.5 | 12.5 | good, continuous 20-hr print caused blade fusion and low density |

TABLE 9 shows the experimental results when the surface roughness Rz on the development roller 20 was set at a constant value of 12 μm. Under this condition that the surface roughness Rz was the highest; resultantly, the toner layer thickness dt was likely to rise, and thus fogging was likely to occur. To restrict such fogging, it is necessary to raise the blade pressure Pb, but the raised blade pressure Pb would disadvantageously be likely to cause the fusion as described above to occur. In addition, though not shown in the table, if Rz were more than 12 μm, the image would exhibit white spots to make the image quality like a rough skin.

TABLE 9

| Rz (μm) | Pb(gf/cm) | Vt(-V) | dt(μm) | Image Density |
|---|---|---|---|---|
| 12 | 10 | 80.4 | 18.5 | unstable toner layer formation, some fogs and escape from blade occurred |
| 12 | 15 | 62.8 | 16.5 | good |
| 12 | 20 | 60.5 | 16.0 | good |
| 12 | 30 | 58.1 | 15.5 | good |
| 12 | 40 | 56.7 | 15.0 | good |
| 12 | 45 | 54.3 | 14.5 | good |
| 12 | 50 | 52.6 | 14.0 | good, continuous 24-hr print caused blade fusion |

TABLE 10 shows the experimental results when the development roller 20 having the surface roughness of 8 μm that could relatively stably form a toner layer having a uniform thickness and the developer T bearing a relatively low charge were used. When the developer T bearing a low charge was used, the toner layer thickness dt was thick and the image density was high. When the blade pressure Pb was low at 10 gf/cm, lots of escapes occurred, as was in TABLE 7.

TABLE 10

| Rz (μm) | Pb(gf/cm) | Vt(-V) | dt(μm) | Image Density |
|---|---|---|---|---|
| 8 | 10 | 73 | 18.0 | unstable toner layer formation, some fogs and escape from blade occurred |
| 8 | 15 | 55 | 16.0 | good |
| 8 | 20 | 53 | 15.5 | good |
| 8 | 30 | 51 | 15.0 | good |
| 8 | 40 | 49 | 14.5 | good |
| 8 | 45 | 47 | 14.0 | good |
| 8 | 50 | 45 | 13.5 | good, continuous 16-hr print caused blade fusion |

TABLE 11 shows the experimental results when the development roller 20 having the surface roughness Rz of 8 μm that could relatively stably form a toner layer having a uniform thickness and the developer T bearing a relatively high charge were used. When the developer T bearing a high charge was used, the toner layer thickness dt was thin, and fogging became unlikely to occur. In addition, lots of escapes from the blade 30 were caused, because the high charge of the developer T was unlikely to deposit the development roller 20. In other words, the image force was low.

TABLE 11

| Rz(μm) | Pb(gf/cm) | Vt(-V) | dt(μm) | Image Density |
|---|---|---|---|---|
| 8 | 10 | 75.3 | 16.0 | unstable toner layer formation, escape from blade occurred |
| 8 | 15 | 57.2 | 14.0 | good |
| 8 | 20 | 55.3 | 13.5 | good |
| 8 | 30 | 53.2 | 13.0 | good |
| 8 | 40 | 51.6 | 12.5 | good |
| 8 | 45 | 49.3 | 12.0 | good |
| 8 | 50 | 47.8 | 11.5 | good, continuous 24-hr print caused blade fusion |

The volume average particle diameter D was 4 through 12 μm, preferably about 8 μm. This is because the toner smaller than 4 μm does not exist at present, and because the toner bigger than 12 μm would cause a decrease of resolution in image quality. The potential Vt of the toner layer thickness was -15V through -40V. This is because the potential lower than -40V would make the toner layer thick, and escapes due to unstable toner regulation occur, and because the potential higher than -15V would make development efficiency decrease. The surface roughness Rz on the development roller was 5 through 12 μm. This is because the surface roughness Rz smaller than 5 μm would be likely to make the toner layer thin, and because surface roughness Rz larger than 12 μm would make the toner layer thick, producing fogging, and exhibiting a white spot like a rough skin. The blade line pressure Pb should range from 15 through 45 g/cm. This is because the blade line pressure Pb smaller than 15 g/cm would cause escapes from the blade, and because the blade line pressure Pb larger than 45 g/cm would become likely to produce a blade fusion.

According to the present embodiment, a toner layer of uniform thickness can be formed on the development roller 20, by using the metal development roller 20 and the blade 30 each having a high processing accuracy, low manufacturing cost, and high stability of properties. Laser Scan Micrometer manufactured by Keyence Corporation may be used to measure the uniformity, for example. Consequently, the present embodiment can avoid a reduced image density, increased fogging in the non-image area, toner escapes from the blade, and toner fusion onto the blade and deteriorated toner charge due to the high stress, thereby obtaining high-quality images. According to the present embodiment, the volume average particle diameter of the toner is 8.0 μm, and the preferred toner layer thickness is between 10 and 18 μm, more preferably between 12 and 16 μm.

To evaluate the fusion, the development roller 20 is driven to rotate at idle, and if 16 hours have passed without fusion, the development roller 20 is rated as good. The blade pressure ranges from 15 through 45 gf/cm, and preferably from 20 through 40 gf/cm.

The image forming device 200 as one exemplified embodiment of the present invention, as shown in FIG. 1, includes a development device 100, a photosensitive drum 210, a pre-charger 220, an exposure part 230, and a transfer roller 250. The photosensitive drum 21 structurally has a photosensitive dielectric layer on a rotatable drum-shaped conductive support, and may be uniformly charged by the pre-charger 220. For example, the photosensitive drum 210 is an OPC or an aluminum drum to which a separated function organic photosensitive body is applied at a thickness of approximately 20 μm, and the external diameter is, for instance, 30 mm, and rotates at a circumferential velocity of 72.8 mm/s in the arrow direction.

The pre-charger 220 is a brush roller charger, and uniformly charges the surface of the photosensitive drum 210 at approximately −670V. A DC voltage of −645V is applied, and an AC peak-to-peak voltage of 1,150 V is charged, to the pre-charger 220. Next, the exposure part 230 uses a laser beam of 0.24 mw to form an image corresponding to a print signal on the photosensitive drum 210. Then, a charging state in an area where an image is formed by the beam on the uniformly charged photosensitive drum 210 is neutralized and canceled (e.g., at −50V) by the effect of the above conductive support, and a latent image as a reverse charged pattern corresponding to the light and shade of the original document is formed. The latent image is visualized into a toner image by the development device 100.

In the development device 100, the development roller 20 in contact with the photosensitive drum 210 rotates at 1.15 times higher the circumferential velocity than and in the same direction as the photosensitive drum 210, the blade 30 regulates the developer T supplied from the reset roller 10, and forms a toner layer on the development roller 20. The development device 100 in the present embodiment can stably form a toner layer having a uniform thickness on the development roller 20. The toner is negatively charged using the sliding friction among the reset roller 10, the development roller 20 and the blade 30.

By the bias power supply 50, −420V is applied to the reset roller 10, and −320V is applied to the development roller 20, in the development device 100. Thereafter, the toner layered on the development roller 20 is deposited onto the electrostatic latent image area on the photosensitive drum 210 by the development bias voltage applied to the development roller 20, and developed. Toner that has not contributed to the development is scraped off by the backward rotating reset roller 10 below the development roller 20, and returned through the bottom part of the reset roller 30 to the frame 40. The toner image on the photosensitive drum 210 thus obtained is transferred at the transfer roller 240 onto a sheet of printing paper, which is timely fed along the feed path PP by feed rollers (not shown). The cleaner 250 collects the remaining toner on the photosensitive drum 210. A transferred sheet of the printing paper is then fed to a fixing part (not shown), get fixed, and finally dispensed out.

Figure 21:
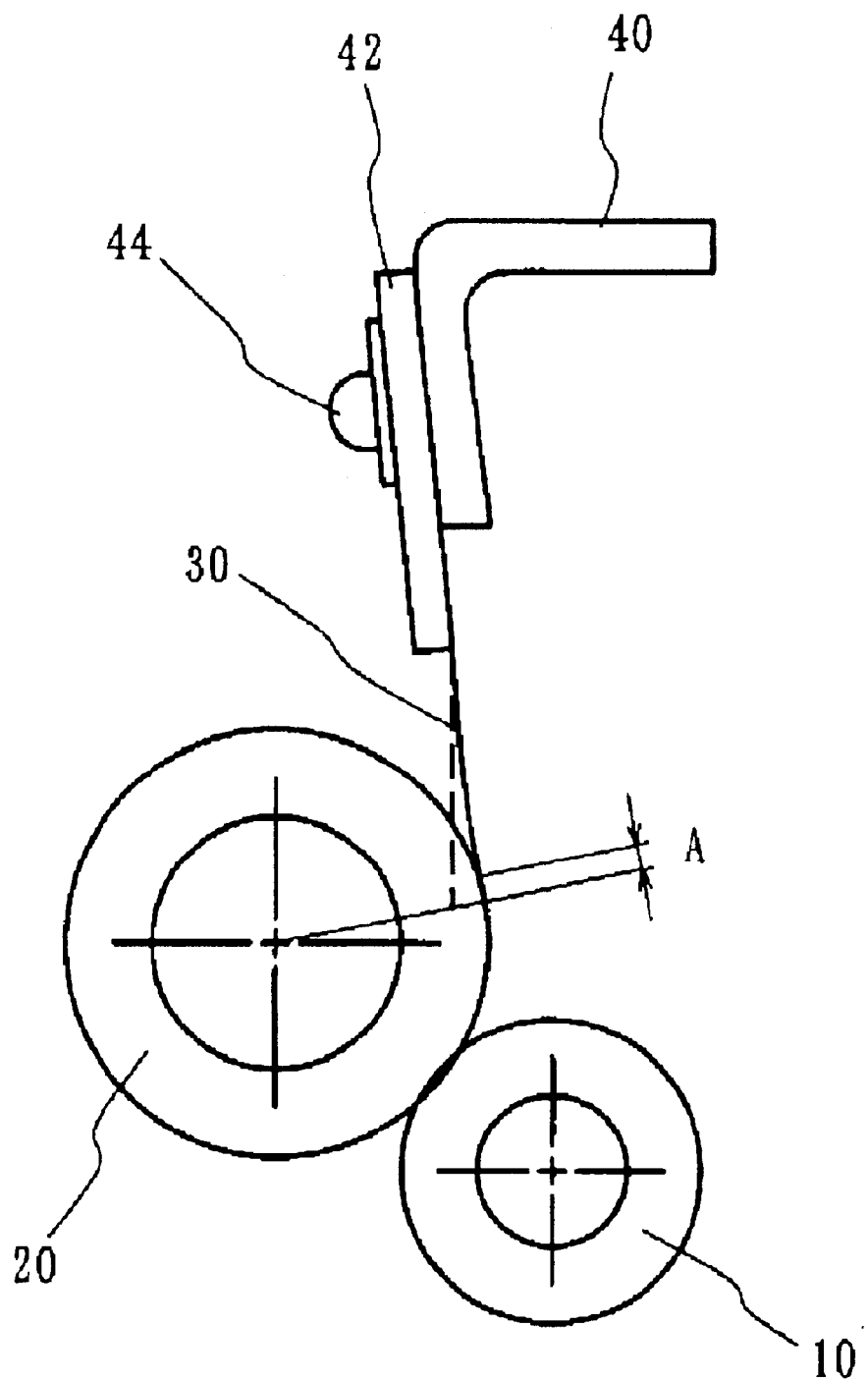
FIG. 21 is a partially enlarged view of the blade 30 and the vicinity thereof in the device shown in FIG. 1.
Figure 22:
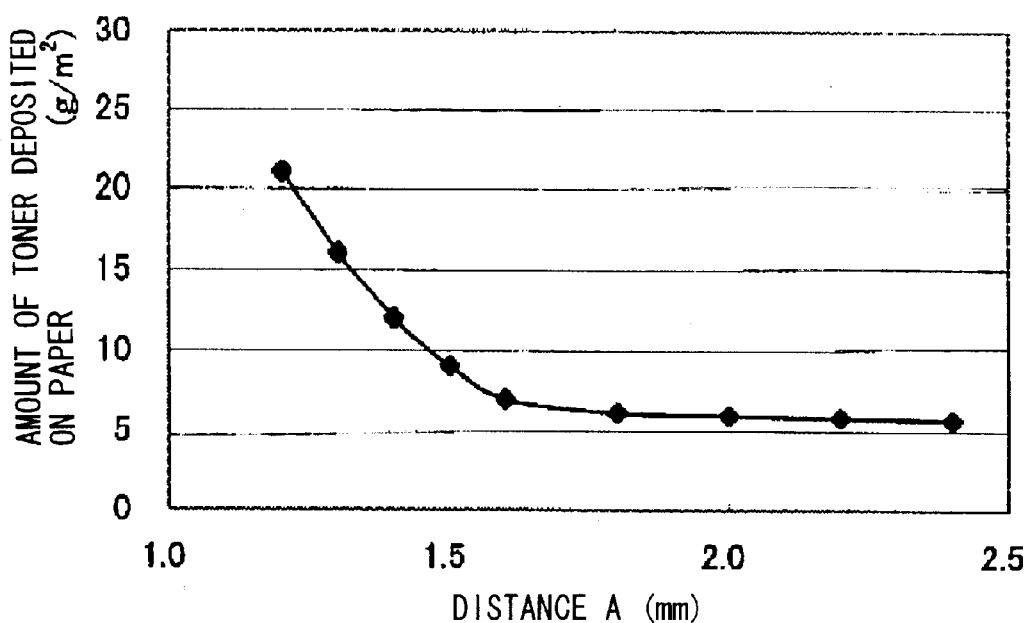
FIG. 22 is a graph showing a relationship between the distance A shown in FIG. 21 and the amount of the amount of toner deposited on the paper.
Figure 23:
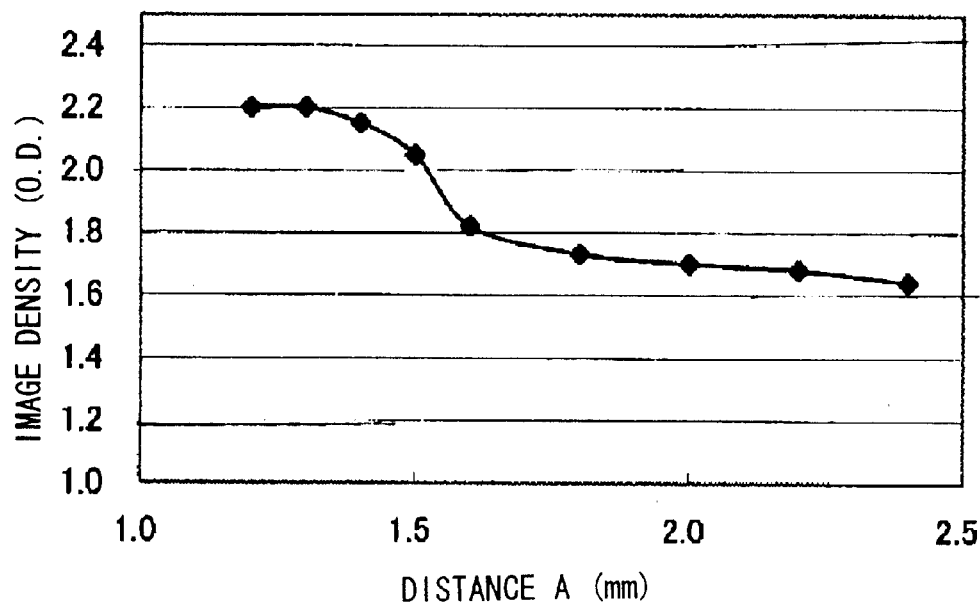
FIG. 23 is a graph showing a relationship between the distance A shown in FIG. 21 and the image density.
Figure 24:
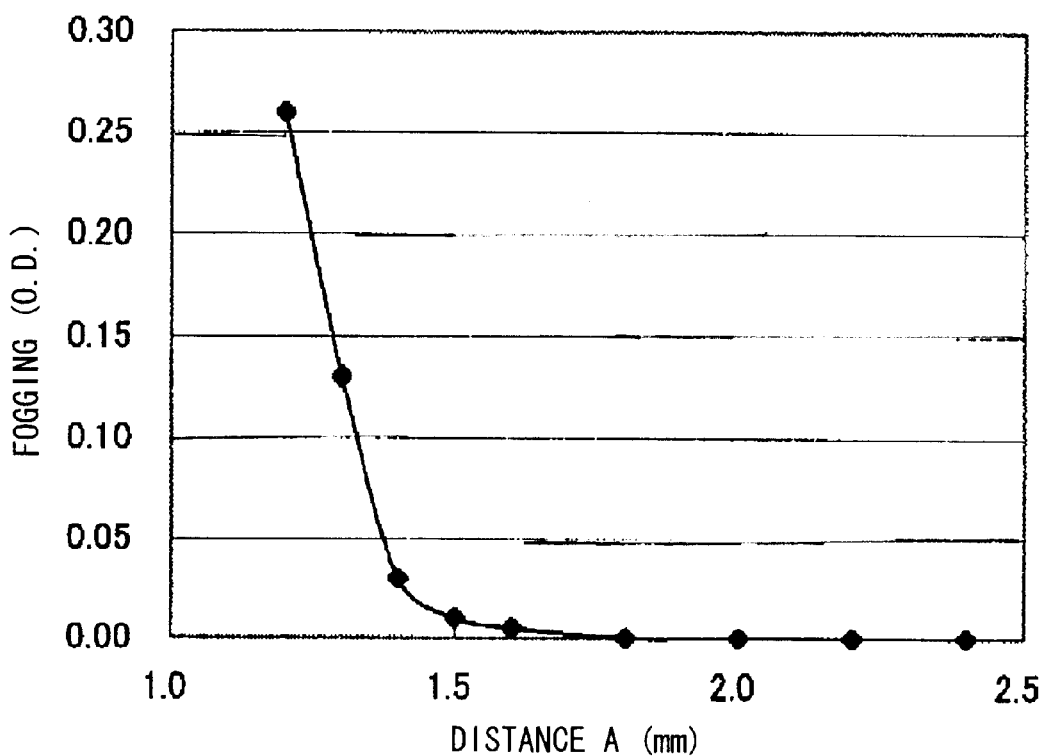
FIG. 24 is a graph showing a relationship between the distance A shown in FIG. 21 and the fogging measured by the O.D. meter.

As shown in FIG. 21, a distance between the blade 30 before contact with the development roller 20 as represented by the broken line, and that after contact with the development roller 20 as represented by the solid line is A. FIG. 21 is a partially enlarged view near the blade 30 shown in FIG. 1. The blade 30 is sandwiched between the frame 40 and the support plate 42, and further fastened on the frame 40 with the fastening screw 44. A relationship between the distance A and the image quality formed on the printing paper are shown in FIGS. 22 through 24, and TABLE 12. FIG. 22 is a graph showing a relationship between the distance A and the amount of toner deposited on the paper before the fixing step (transfer efficiency: 90%). FIG. 23 is a graph showing a relationship between the distance A and the image density determined with the O.D. meter. FIG. 24 is a graph showing a relationship between the distance A and the fogging on the paper determined with the O.D. meter. It is understood that, as shown in FIGS. 22 through 24, the distance A ranging 2.0 mm±0.2 mm provides a stable results.

TABLE 12

| Distance A (mm) | Amount of deposition (g/m$^2$) | Image density (O.D.) | Fogging (O.D.) |
| --- | --- | --- | --- |
| 1.2 | 21.00 | 2.20 | 0.26 |
| 1.3 | 16.00 | 2.20 | 0.13 |
| 1.4 | 12.00 | 2.15 | 0.03 |
| 1.5 | 9.00 | 2.05 | 0.01 |
| 1.6 | 7.00 | 1.82 | 0.01 |
| 1.8 | 6.15 | 1.73 | 0.00 |
| 2.0 | 6.00 | 1.70 | 0.00 |
| 2.2 | 5.85 | 1.68 | 0.00 |
| 2.4 | 5.70 | 1.64 | 0.00 |

Figure 25:
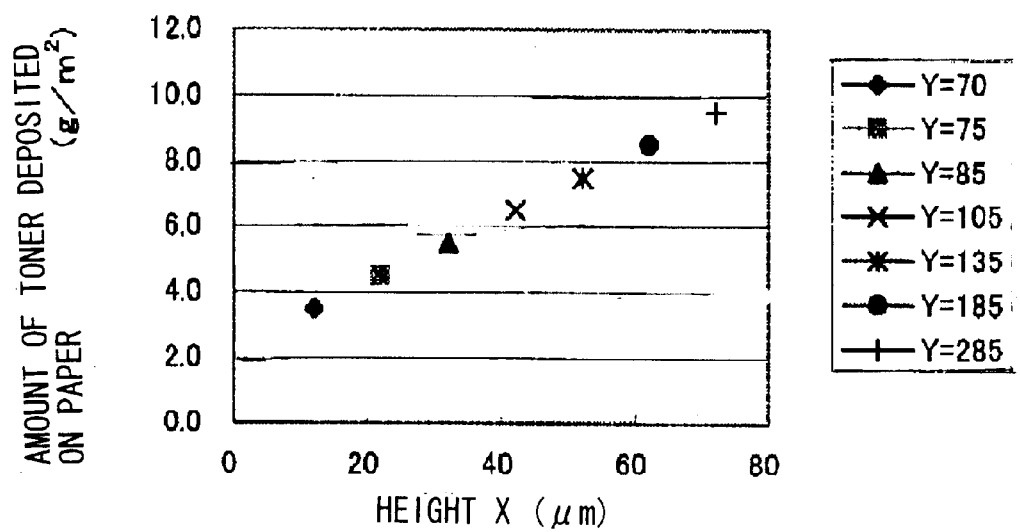
FIG. 25 is a graph showing a relationship among the height X, the length Y, and the amount of toner deposited on the paper, when the sheet thickness t=0.08 mm.
Figure 26:
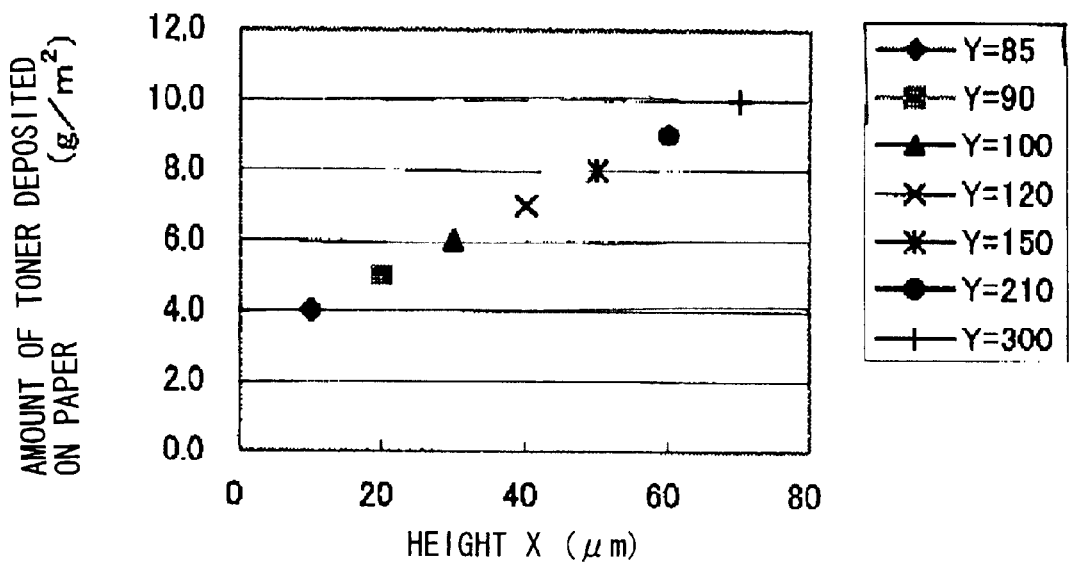
FIG. 26 is a graph showing a relationship among the height X, the length Y, and the amount of toner deposited on the paper, when the sheet thickness t=0.10 mm.
Figure 27:
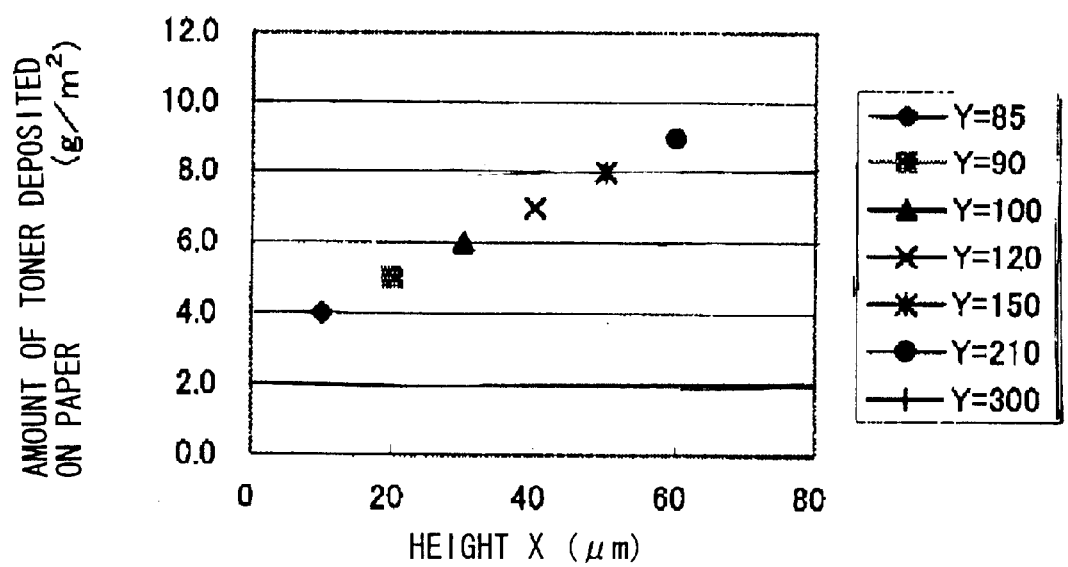
FIG. 27 is a graph showing a relationship among the height X, the length Y, and the amount of toner deposited on the paper, when the sheet thickness t=0.12 mm.
Figure 28:
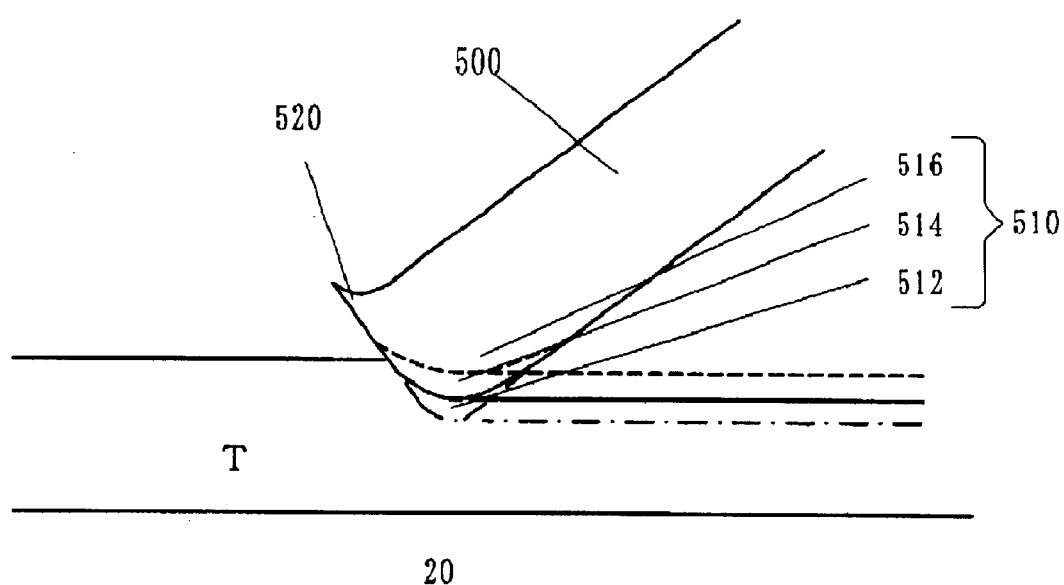
FIG. 28 is a schematic sectional view showing a relationship between the curvature of the conventional blade and the toner layer to be regulated, when the blade may include any one of the end portions having three different curvatures.

A relationship between the height X and length Y of the curve in the end portion 32 of the blade 30, and the quality of images formed on the printing paper is shown in FIGS. 25 through 27, and TABLEs 13 through 15. FIG. 25 and TABLE 13 show a relationship between the height X and length Y, and the amount of toner deposited on the paper before the fixing step (Transfer efficiency: 90%), where the sheet thickness t=0.08 mm. FIG. 26 and TABLE 14 show a relationship between the height X and length Y, and the amount of toner deposited on the paper before the fixing step (Transfer efficiency: 90%), where the sheet thickness t=0.10 mm. FIG. 27 and TABLE 15 show a relationship between the height X and length Y, and the amount of toner deposited on the paper before the fixing step (Transfer efficiency: 90%), where the sheet thickness t=0.12 mm. As described above, a relationship shown in FIGS. 3 through 5 is established between the height X and length Y. As may be understood, the height X and length Y between which the relationship shown in FIGS. 3 through 5 is established are proportional to the amount of toner deposited on the paper for each sheet thickness.

TABLE 13

| | Y | | | | | | |
| --- | --- | --- | --- | --- | --- | --- | --- |
| X | 70 | 75 | 85 | 105 | 135 | 185 | 285 |
| 12 | 3.5 | | | | | | |
| 22 | | 4.5 | | | | | |
| 32 | | | 5.5 | | | | |
| 42 | | | | 6.5 | | | |
| 52 | | | | | 7.5 | | |
| 62 | | | | | | 8.5 | |
| 72 | | | | | | | 9.5 |

TABLE 14

| | Y | | | | | | |
| --- | --- | --- | --- | --- | --- | --- | --- |
| X | 85 | 90 | 100 | 120 | 150 | 210 | 300 |
| 10 | 4.0 | | | | | | |
| 20 | | 5.0 | | | | | |
| 30 | | | 6.0 | | | | |
| 40 | | | | 7.0 | | | |
| 50 | | | | | 8.0 | | |
| 60 | | | | | | 9.0 | |
| 70 | | | | | | | 10.0 |

TABLE 15

| X | Y=100 | 105 | 115 | 135 | 165 | 225 | 315 |
|---|---|---|---|---|---|---|---|
| 8 | 4.5 | | | | | | |
| 18 | | 5.5 | | | | | |
| 28 | | | 6.5 | | | | |
| 38 | | | | 7.5 | | | |
| 48 | | | | | 8.5 | | |
| 58 | | | | | | 9.5 | |
| 68 | | | | | | | 10.5 |

Although the preferred embodiments of the present invention have been described above, various modifications and changes may be made in the present invention without departing from the spirit and scope thereof. For instance, the present invention is applicable not only to the contact-type nonmagnetic monocomponent development process, but also to the noncontact-type nonmagnetic monocomponent development process. Moreover, the nonmagnetic dual-component developer or magnetic developer is not excluded from a variety of applications in the present invention.

As described above, the stamping die and method of manufacturing the blade according to the present invention may exemplarily includes a base portion, and a specific curved end portion, and may manufacture the inventive blade usable for regulating a developer layer thickness. For example, one or more of these stamping dies may be used for manufacturing the blade in which an approximately specific relationship is established between the height and length in the end portion of the blade for each thickness of the above base portion, the blade in which an approximately specific relationship is established between the length in the end portion and the second angle irrespective of the hardness of the blade material, and/or the blade in which an approximately specific relationship is established between the length of the end portion and the second angle for each thickness of the base portion of the blade. The inventive development device and image-forming device having the blade also have the same effects as the blade. The present invention contributes toward the formation of a high-quality image in that the blade having a shape and dimensions required to form a specified developer layer thickness can be reliably manufactured.

The development device and image-forming device as another exemplified embodiment of the present invention can maintain a predetermined developer layer thickness on the development roller, as the blade is harder than an inorganic fine particle, and not worn out. The developer layer formed by the blade does not become uneven or thick over time, and thus a high-quality image can be maintained for a long time.

What is claimed is:

1. A stamping die comprising:

an upper mold portion including a knockout;

a lower mold portion including a punch, and movable relative to said upper mold portion, wherein said knockout includes in cross section a first flat portion and a triangular projection portion that projects from said first flat portion, said punch includes in cross section a second flat portion and a triangular groove portion that is formed on said second flat portion, and a first angle at which said triangular projection portion projects from said first flat portion is larger than a second angle at which said triangular groove portion recesses from said second flat portion; and wherein a difference between said first angle and said second angle is within five degrees.

2. A stamping die according to claim 1, wherein a difference between said first angle and said second angle is within two degrees.

3. A stamping die comprising:

an upper mold portion including a knockout;

a lower mold portion including a punch, and movable relative to said upper mold portion, wherein said knockout includes in cross section a first flat portion and a triangular projection portion that projects from said first flat portion, said punch includes in cross section a second flat portion and a triangular groove portion that is formed on said second flat portion, and a first width of a joint between said triangular projection portion and said first flat portion is smaller than a second width of said triangular groove portion viewed from said second flat portion; and wherein said first width is 0.05 mm, and said second width is 0.1 mm.

* * * * *